US010305952B2

(12) United States Patent
Shetty et al.

(10) Patent No.: US 10,305,952 B2
(45) Date of Patent: May 28, 2019

(54) PREFERENCE-AWARE CONTENT STREAMING

(71) Applicant: T-Mobile USA, Inc., Bellevue, WA (US)

(72) Inventors: Sandesh Shetty, Sammamish, WA (US); Srinivas Meka, Bothell, WA (US); Kevin Lau, Issaquah, WA (US); Warren J. McNeel, Issaquah, WA (US); Cristian Asandului, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 105 days.

(21) Appl. No.: 15/214,033

(22) Filed: Jul. 19, 2016

(65) Prior Publication Data

US 2017/0134459 A1    May 11, 2017

Related U.S. Application Data

(63) Continuation-in-part of application No. 14/936,495, filed on Nov. 9, 2015, now Pat. No. 10,193,943.
(Continued)

(51) Int. Cl.
*G06F 15/16* (2006.01)
*H04L 29/06* (2006.01)
(Continued)

(52) U.S. Cl.
CPC ...... *H04L 65/4092* (2013.01); *H04L 12/1435* (2013.01); *H04L 12/1475* (2013.01);
(Continued)

(58) Field of Classification Search
CPC ............ H04L 65/4092; H04L 12/1407; H04L 12/1432; H04L 67/02; H04L 67/20; H04L 67/26; H04L 67/42; H04W 88/02
(Continued)

(56) References Cited

U.S. PATENT DOCUMENTS 5,794,140 A    8/1998 Sawyer
6,282,206 B1   8/2001 Hindus et al.
(Continued)

FOREIGN PATENT DOCUMENTS

WO    WO2012172430    12/2012

OTHER PUBLICATIONS

Broida, Rick. "Force YouTube to Play HD Videos Every Time". Jun. 22, 2010. p. 1. https://www.pcworld.com/article/199532/Force_YouTube_to_Play_HD_Videos_Every_Time.html (Year: 2010).*
(Continued)

*Primary Examiner* — Imad Hussain
(74) *Attorney, Agent, or Firm* — Lee & Hayes, P.C.; Robert C. Peck; Christopher J. White

(57) ABSTRACT

In some implementations, a telecommunications network can include a core network device communicatively connectable with user equipment (UE). The core network device can receive, via a network interface, an indication of a change to a user preference associated with the user device. The core network device can transmit a notification message including a pseudonymous identifier, the notification message based at least in part on the indication of the change. The UE can transmit, via a network interface, information of an account associated with the UE to a content provider. The information can include the pseudonymous identifier. The UE can then render content received from the content provider. The content provider can receive, via a network, the pseudonymous identifier and a request for content. The content provider can determine a quality setting associated with the pseudonymous identifier, and provide the content based at least in part on the quality setting.

20 Claims, 16 Drawing Sheets

Related U.S. Application Data

(60) Provisional application No. 62/310,472, filed on Mar. 18, 2016.

(51) Int. Cl.

| | | |
|---|---|---|
| *H04L 29/08* | (2006.01) | |
| *H04L 12/14* | (2006.01) | |
| *H04L 12/46* | (2006.01) | |
| *H04M 15/00* | (2006.01) | |
| *H04W 4/24* | (2018.01) | |
| *H04W 88/02* | (2009.01) | |
| *H04W 12/02* | (2009.01) | |

(52) U.S. Cl.
CPC ...... *H04L 12/1485* (2013.01); *H04L 12/1496* (2013.01); *H04L 12/4625* (2013.01); *H04L 65/80* (2013.01); *H04L 67/306* (2013.01); *H04M 15/00* (2013.01); *H04M 15/07* (2013.01); *H04M 15/09* (2013.01); *H04M 15/8083* (2013.01); *H04W 4/24* (2013.01); *H04W 12/02* (2013.01); *H04W 88/02* (2013.01)

(58) Field of Classification Search
USPC ........................................................ 709/203
See application file for complete search history.

(56) References Cited

U.S. PATENT DOCUMENTS

| | | | |
|---|---|---|---|
| 6,865,426 B1 | 3/2005 | Schneck et al. | |
| 7,840,667 B2 | 11/2010 | Weller et al. | |
| 8,838,589 B1 | 9/2014 | Tam | |
| 9,762,635 B2 | 9/2017 | Sebastian et al. | |
| 9,769,643 B2* | 9/2017 | Baron | H04L 12/14 |
| 9,860,136 B2* | 1/2018 | Ritter | H04L 41/5029 |
| 2002/0147766 A1* | 10/2002 | Vanska | G06F 21/6245 |
| | | | 709/203 |
| 2002/0190725 A1 | 12/2002 | Craven | |
| 2003/0128674 A1 | 7/2003 | Kong et al. | |
| 2004/0119814 A1 | 6/2004 | Clisham et al. | |
| 2004/0213259 A1 | 10/2004 | Porter | |
| 2004/0242203 A1 | 12/2004 | Lipsanen et al. | |
| 2006/0036949 A1 | 2/2006 | Moore et al. | |
| 2006/0206617 A1 | 9/2006 | Rey et al. | |
| 2007/0091843 A1* | 4/2007 | Patel | H04L 63/0853 |
| | | | 370/331 |
| 2007/0133412 A1 | 6/2007 | Hutter et al. | |
| 2007/0133603 A1 | 6/2007 | Weaver et al. | |
| 2007/0189300 A1 | 8/2007 | Bellora et al. | |
| 2007/0258465 A1* | 11/2007 | Ma | H04W 28/08 |
| | | | 370/395.53 |
| 2008/0040226 A1 | 2/2008 | Roker | |
| 2008/0070550 A1* | 3/2008 | Hose | H04L 63/10 |
| | | | 455/411 |
| 2008/0091824 A1* | 4/2008 | Patel | H04L 12/66 |
| | | | 709/225 |
| 2008/0279112 A1* | 11/2008 | Schryer | H04L 12/2809 |
| | | | 370/252 |
| 2009/0068991 A1 | 3/2009 | Aaltonen et al. | |
| 2009/0282162 A1 | 11/2009 | Mehrotra et al. | |
| 2010/0058401 A1 | 3/2010 | Beyabani | |
| 2010/0085942 A1 | 4/2010 | Oota et al. | |
| 2010/0159924 A1* | 6/2010 | Lagerman | H04W 8/26 |
| | | | 455/433 |
| 2010/0161387 A1 | 6/2010 | Harrang et al. | |
| 2010/0179987 A1 | 7/2010 | Sebastian et al. | |
| 2010/0254368 A1 | 10/2010 | Yamaura | |
| 2010/0312623 A1* | 12/2010 | Almodovar Herraiz | |
| | | | G06Q 30/02 |
| | | | 705/14.4 |
| 2011/0167170 A1 | 7/2011 | Kovvali et al. | |
| 2011/0231551 A1* | 9/2011 | Hassan | H04L 12/1421 |
| | | | 709/226 |
| 2012/0209753 A1 | 8/2012 | Hodges | |
| 2012/0311068 A1 | 12/2012 | Gladwin et al. | |
| 2013/0031279 A1 | 1/2013 | Venugopal et al. | |
| 2013/0083761 A1* | 4/2013 | Pandey | H04W 72/04 |
| | | | 370/329 |
| 2013/0097674 A1* | 4/2013 | Jindal | H04L 63/0876 |
| | | | 726/4 |
| 2013/0100228 A1 | 4/2013 | Tapia et al. | |
| 2013/0231081 A1 | 9/2013 | Mo et al. | |
| 2013/0254345 A1 | 9/2013 | Kook et al. | |
| 2013/0318252 A1* | 11/2013 | Bulava | H04N 21/00 |
| | | | 709/231 |
| 2014/0003450 A1* | 1/2014 | Bentley | H04N 7/15 |
| | | | 370/468 |
| 2014/0146822 A1 | 5/2014 | Janardhanan et al. | |
| 2014/0177497 A1* | 6/2014 | Backholm | H04W 52/0232 |
| | | | 370/311 |
| 2014/0181850 A1* | 6/2014 | Weaver | H04N 7/17318 |
| | | | 725/14 |
| 2014/0204740 A1 | 7/2014 | Tokutsu et al. | |
| 2015/0112830 A1 | 4/2015 | Boulter et al. | |
| 2015/0113554 A1 | 4/2015 | Stern | |
| 2015/0195150 A1* | 7/2015 | Ritter | H04L 41/5029 |
| | | | 709/223 |
| 2015/0237490 A1* | 8/2015 | Chang | H04M 15/61 |
| | | | 455/406 |
| 2015/0281395 A1* | 10/2015 | Pandiarajan | H04L 67/322 |
| | | | 709/219 |
| 2015/0341491 A1 | 11/2015 | Lau et al. | |
| 2016/0014630 A1* | 1/2016 | Xu | H04W 76/10 |
| | | | 370/252 |
| 2016/0066276 A1 | 3/2016 | Su et al. | |
| 2016/0103589 A1* | 4/2016 | Dziuk | G06F 16/44 |
| | | | 715/716 |
| 2016/0192296 A1* | 6/2016 | Rehan | H04L 65/604 |
| | | | 455/574 |
| 2016/0248916 A1* | 8/2016 | Payne, III | H04M 15/725 |
| 2016/0301582 A1 | 10/2016 | Arndt et al. | |
| 2017/0093942 A1* | 3/2017 | Danielsson | H04L 49/90 |
| 2017/0171775 A1 | 6/2017 | Vagelos | |
| 2017/0214804 A1 | 7/2017 | Payne, III et al. | |
| 2017/0230292 A1 | 8/2017 | Lau | |
| 2018/0220276 A1 | 8/2018 | Senarath et al. | |
| 2018/0220277 A1 | 8/2018 | Senarath et al. | |
| 2019/0007376 A1* | 1/2019 | Norrman | H04W 8/26 |

OTHER PUBLICATIONS

Killoran, Amber. "Why does YouTube on Firefox offer so few quality options even if the video can be viewed in higher quality on Chrome or when it is embeded?". Jun. 14, 2014. pp. 1-2. https://support.mozilla.org/en-US/questions/1006250 (Year: 2014).*

Office Action for US Patent Application, dated Aug. 25, 2017, Lau, "Dynamic Network Rate Control", 23 pages.

PCT Search Report and Written Opinion dated May 15, 2017 for PCT Application No. PCT/US17/15947, 9 pages.

PCT Search Report and Written Opinion dated May 17, 2017 for PCT Application No. PCT/US17/16990, 14 pages.

The PCT Search Report and Written Opinion dated Feb. 2, 2017 for PCT Application No. PCT/US2016/059899, 13 pages.

Low, "How to Turn Off T-Mobile's Binge On and Why You'd Want to—How to Turn Off T-Mobile's Binge On", retrieved on May 20, 2016, available at <<http://www.tomsguide.com/us/how-to-turn-off-bingeon,review-3330.html>>, May 17, 2016, 12 pages.

Michaels, "YouTube Finally Joins T-Mobile's Binge On", retrieved on May 20, 2016, available at: <<http://www.tomsguide.com/us/youtube-joins-binge-on,news-22431.html>>, May 17, 2016, 2 pages.

Terzis et al., "Announcing the Mobile Data Plan API", retrieved on Apr. 28, 2016, available at: <<http://youtube-eng.blogspot.com/2016/04/announcing-mobile-data-plan-api.html>>, Apr. 27, 2016, 4 pages.

YouTube, "Mobile Data Plan API", retrieved on Apr. 28, 2016, available at: <<https://docs.google.com/document/d/1LU3qzT-

(56) References Cited

OTHER PUBLICATIONS vpK38P2DKF-hLJIXV3hWo_fDPRB00WZUIK_4/edit?pref=2&pli=1>>, 20 pages.

Office Action for U.S. Appl. No. 14/936,495, dated Jun. 18, 2018, Lau, "Data-Plan-Based Quality Setting Suggestions and Use Thereof to Manage Content Provider Services", 12 pages.

Eisenach, "The Economics of Zero Rating", NERA Economic Consulting, Insight in Economics, Mar. 2015, pp. 1-16.

Office Action for U.S. Appl. No. 15/018,649, dated Aug. 25, 2017, Lau, "Dynamic Network Rate Control", 27 pages.

Office Action for U.S. Appl. No. 14/936,495, dated Mar. 5, 2018, Lau, "Data-Plan-Based Quality Setting Suggestions and Use Thereof to Manage Content Provider Services", 4 pages.

Office Action for U.S. Appl. No. 15/018,649 dated Nov. 14, 2018, Lau, "Dynamic Network Rate Control", 33 pages.

"YouTube—Broadcast Yourself." May 22, 2010. Retrieved Jan. 4, 2019, from <<https://web.archive.org/web/20100522050653/https://www.youtube.com/create_account>>, 1 pg.

* cited by examiner

PREFERENCE-AWARE CONTENT STREAMING

CROSS-REFERENCE TO RELATED APPLICATIONS

This application is a continuation-in-part of, and claims priority to and the benefit of, U.S. patent application Ser. No. 14/936,495, filed Nov. 9, 2015, and entitled "Data-Plan-Based Quality Setting Suggestions and Use Thereof to Manage Content Provider Services", and is a nonprovisional application of, and claims priority to and the benefit of, U.S. Provisional Application Ser. No. 62/310,472, filed Mar. 18, 2016, and entitled "API for Optimized Content Quality Delivery", the entirety of each of which is incorporated herein by reference.

BACKGROUND

Whether streaming video or music, or downloading an application, a video, or a song for later use, viewing, or listening, the trend towards increased content consumption on user devices continues. Example user devices can include smartphones, tablets, or laptop computers. Such content is frequently received at user devices after being transmitted across a cellular network, straining both radio frequency resources at access networks and core network resources. To manage the demands on these network resources, operators of cellular networks often include content consumption limits in user data plans. These limits are expressed in a data measurement (e.g., a number of gigabytes) for a time period (e.g., a month). For many users, however, it is quite difficult to measure or understand their content consumption against these limits. For example, users may not understand how much streaming a particular movie will consume. Users also may not understand the effect on content consumption of higher vs. lower video quality. Users without a deep understanding of the underlying technology may struggle to understand such issues. Even users that understand the technology may not know how the content provider selects service quality. Thus, users may have difficulty managing their content consumption.

Also, third-party content providers often complicate the issue by automatically defaulting to the highest service quality for the content that they deliver, by making it difficult to find a control for service quality (or not offering one), or by embedding content from other third-party content providers within the content that they deliver. In such circumstances, often the only control the user has over the user's content consumption is whether to consume the content at all.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation, in at least one example.

DETAILED DESCRIPTION

Overview

Figure 1:
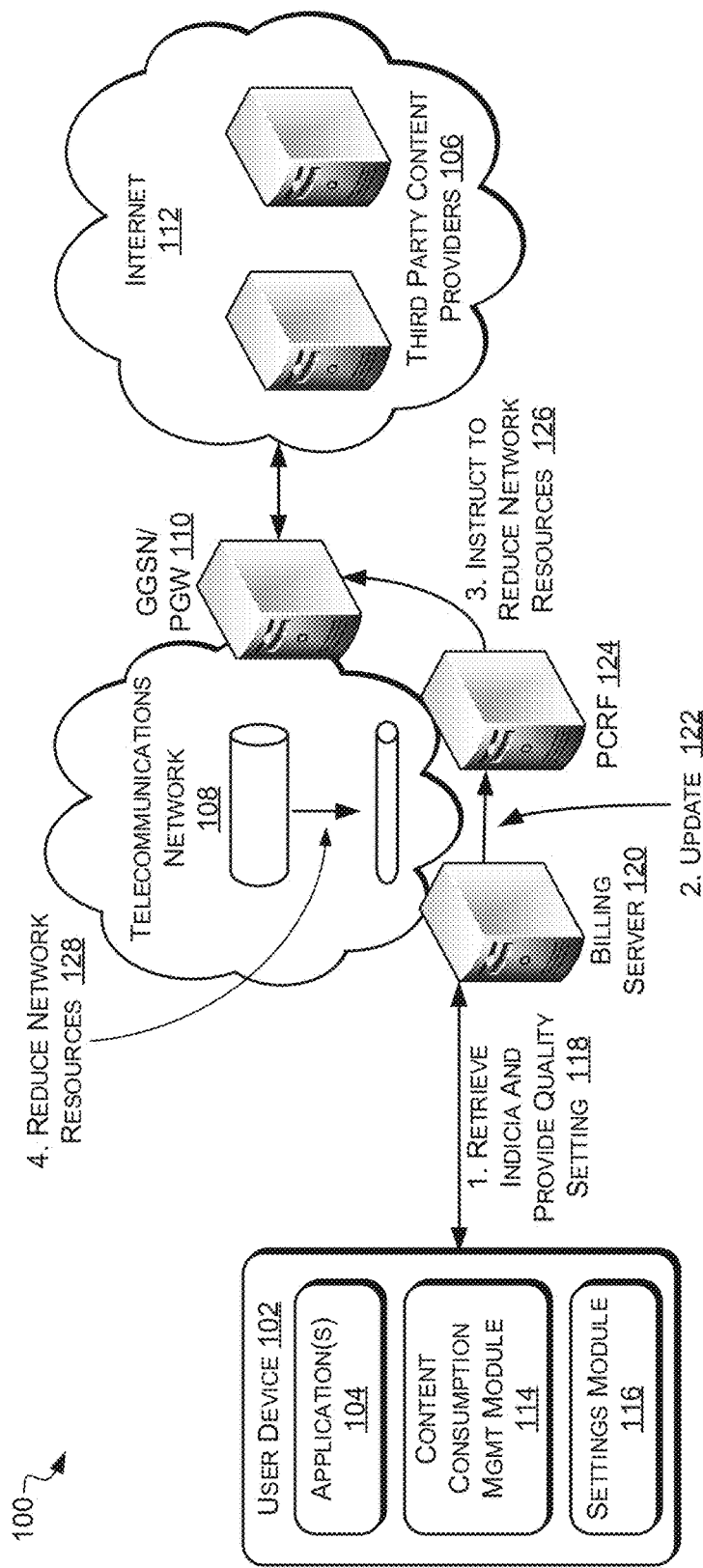
FIG. 1 illustrates an overview and example environment, including a user device, devices of a telecommunications network, and content providers, the user device and the devices of the telecommunications network managing content provider services based on a user-selected quality setting.

In some prior schemes, users do not have an ability to save resources by reducing service quality. This disclosure describes, in part, a network system that permits users to communicate content-quality preferences to content providers. For example, a user desiring to reduce content consumption can establish a preference for standard-definition (SD) video content as opposed to high-definition (HD) video content. Content providers can then provide users content in a way corresponding to that user's preference. Some examples herein permit communicating user preferences to content providers other than, e.g., cellular-network operators. Throughout this document, video streaming is used as an example of content provided by a content provider. Various techniques described herein an additionally or alternatively be used for other types of content, e.g., music, still images, text, or archives, or for other use cases than streaming, e.g., offline downloading or interactive sessions. For example, web pages can be provided without background images if the user has established a preference for reduced content consumption.

This disclosure further describes, in part, a user device that suggests a change to a quality setting associated with the consumption of content from one or more content providers. The change is suggested based both on a user's data plan and on a service quality of content received by the user device. This user-selected quality setting is then provided to the telecommunications network, which reduces network resources available for transmission of the content based on the quality setting. Such reduced network resources cause the content providers to provide content at a service quality no greater than the quality setting. Also, the user may be presented with or defaulted to selecting an option for a program offering consumption of the video content free of charge when provided to the user at a limited service quality. When the user participates, consumption of video content is then conditionally excluded from a consumption metric of the data plan. As used herein, "downgrading" refers to determining or providing content associated with a limited service quality. The limited service quality may include at least one of: limits on peak bandwidth consumption, limits on average bandwidth consumption, limits on the total amount of data (e.g., number of bytes) transferred in a particular session or in a given period of time, or limits on connection duration.

As used herein, a "user device" or "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, an example terminal can be a mobile hotspot such as a WIFI access point using LTE as an upstream connection. Such a terminal may not include a user interface.

In various implementations, the user device may be configured with application(s) and a content consumption management module. The application(s) may receive content from third-party content providers (also referred to herein simply as "content providers") and may render the content based on a service quality. Such a service quality may reflect a data transfer rate at which the content is received over the telecommunications network or a content resolution. Responsive to the application(s) receiving or rendering the content, the content consumption management module may retrieve indicia from the telecommunications network about the service quality associated with the content and about the user's content consumption plan. Based on those indicia, the content consumption management module may provide a suggestion to the user to change a quality setting associated with consumption of the content. For example, content consumption management module may determine based on the indicia that if the user continues to consume content at the current service quality, the user will exceed his or her content consumption plan limit within an hour. Responsive to that determination, the content consumption management module may suggest that the user select a quality setting which will enable the user to instead consume content for a longer duration at an acceptable service quality based on the user device being used and a type of the content. Such suggestions may be provided in a user interface, such as an overlay user interface, along with a selectable control that enables the user to effect the change to the quality setting. Alternatively or additionally, the selectable control may be provided by a different module, such as a settings module, which may allow the user to preemptively select the quality setting before receiving any suggestion to do so. Once a quality setting is selected, the user device may provide that setting to a device of the telecommunications network, such as a billing server or a policy and charging rules function (PCRF) node.

Upon receiving a quality setting, either from the billing server or directly from the user device, the PCRF node may determine whether network resources associated with transmission of the content should be reduced. Upon determining that the network resources should be reduced, the PCRF node may instruct a gateway general packet radio service (GPRS) support node (GGSN) or a packet data network gateway (PGW) to reduce the network resources. Such a reduction of network resources will in turn cause the third-party content providers to reduce the service quality at which they provide content, effectively causing the third-party content providers to adapt content delivery to the specific quality setting.

In further implementations, the billing server may receive an indication that a user is consuming content and, in response, may determine whether the user has elected to participate in a program offering consumption of the content free of charge in exchange for the content being provided to the subscriber at a limited service quality. If the user is participating in the program, the billing server may conditionally exclude the consuming of the video content from a content consumption metric of the content consumption plan.

In some examples, the user device or a device of the telecommunications network may communicate at least one user preference to a content provider. For example, a device of the telecommunications network may communicate the user preference to a server of the content provider, e.g., via a pull or push Application Program Interface (API) or other communications connection. In another example, the content provider can serve content via an app (or other software, and likewise throughout this document) running on a user device. The app may communicate the at least one user preference to the content provider, e.g., via a connection also used to request content.

Illustrative Components

FIG. 1 illustrates an overview and example environment 100, including a user device, devices of a telecommunications network, and content providers, the user device and the devices of the telecommunications network managing content provider services based on a user-selected quality setting. As illustrated, a user device 102 may include application(s) 104 which receive content from third-party content providers 106 over a telecommunications network 108. The third-party content providers 106 may be connected to the telecommunications network 108 through a GGSN/PGW 110 and the Internet 112 or other networks. The user devices 102 also include a content consumption management module 114 and a settings module 116. The content consumption management module 114 may retrieve, at 118, indicia of service quality and consumption plan usage and provide a user-selected quality setting to a billing server 120 of the telecommunications network 108. The billing server 120 may then update, at 122, a PCRF node 124 of the telecommunications network 108 with the quality setting and other user metrics. At 126, the PCRF node 124 may then instruct the GGSN/PGW 110 to reduce network resources and, at 128, based on the quality setting, the GGSN/PGW 110 may reduce the network resources available for transmission of the content from the third-party content providers 106, causing the third-party content providers 106 to reduce service quality to no more than the quality setting.

Figure 2:
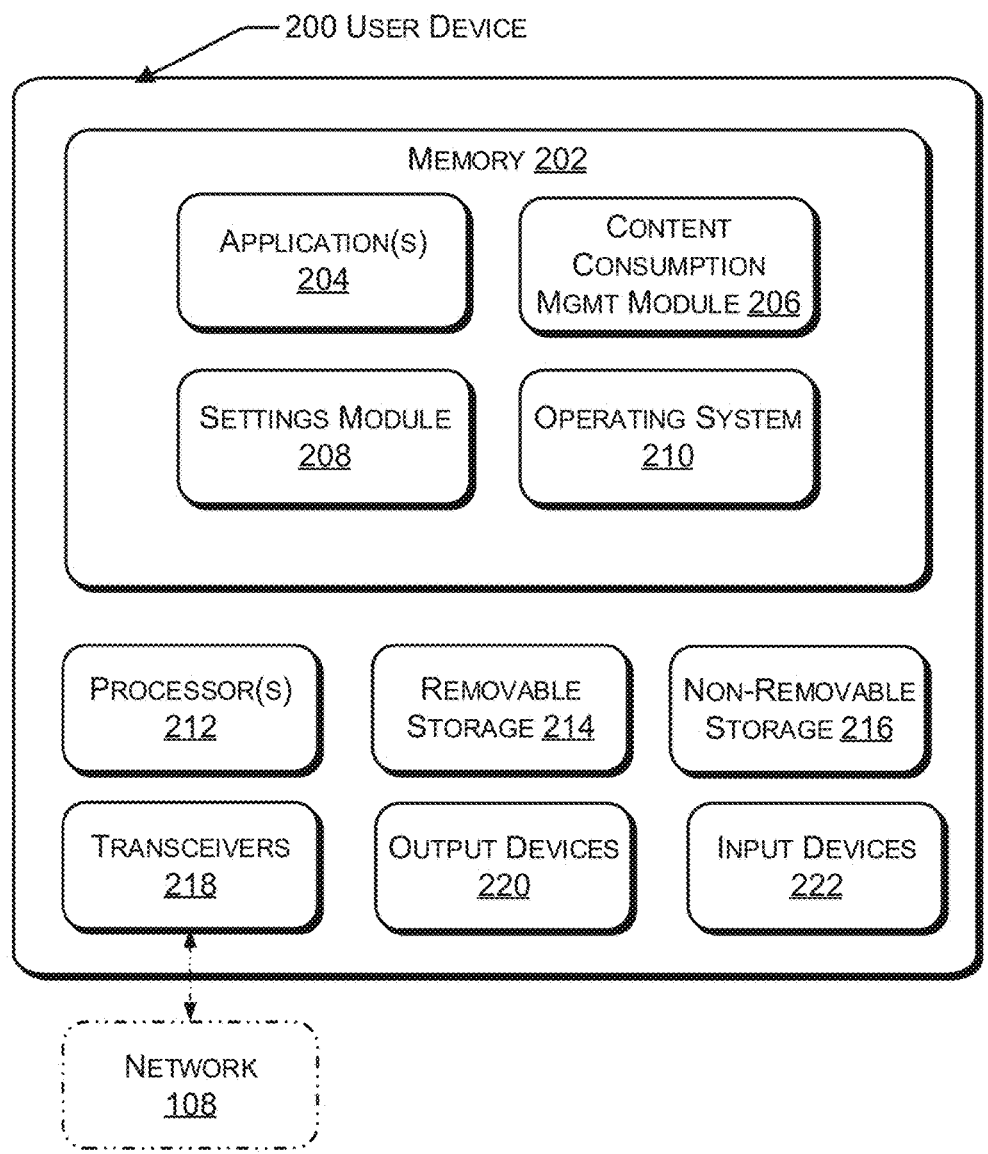
FIG. 2 illustrates a component level view of a user device configured to monitor a user's content consumption and to suggest a reduced quality setting for that content to avoid exceeding a content consumption limit imposed by the user's data plan.

In various implementations, the user device 102 may be any sort of mobile telecommunication device. Such a mobile device may be or include a cellular phone, a smart phone, a tablet computer, a personal computer (PC), a laptop computer, a desktop computer, a workstation, a media player, an accessory device, or any other sort of device or devices. The user device 102 may be associated with a specific telecommunications network, such as telecommunications network 108, as the user of the user device 102 may subscribe to services offered by an operator of the telecommunications network 108. An example user device 102 is illustrated in FIG. 2 and is described in detail below with reference to that figure.

Figure 3:
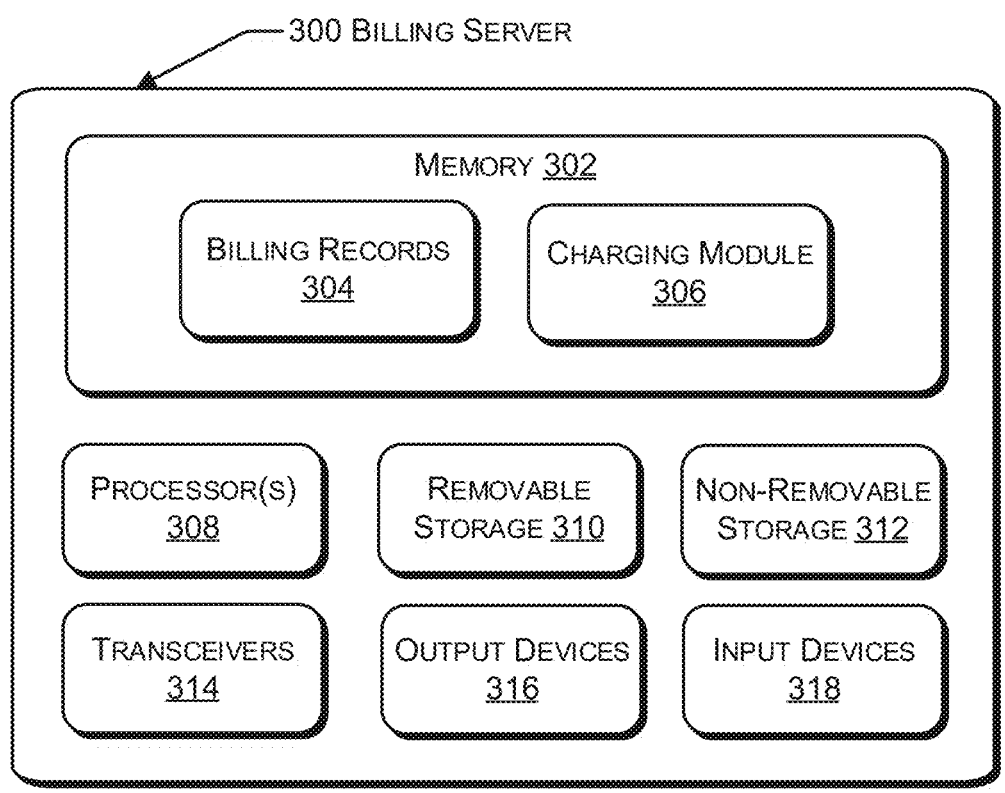
FIG. 3 illustrates a component level view of a billing server configured to store indicia of whether a subscriber has elected to participate in a program offering free data consumption and to conditionally exclude content consumption from a content consumption metric based on the indicia.
Figure 4:
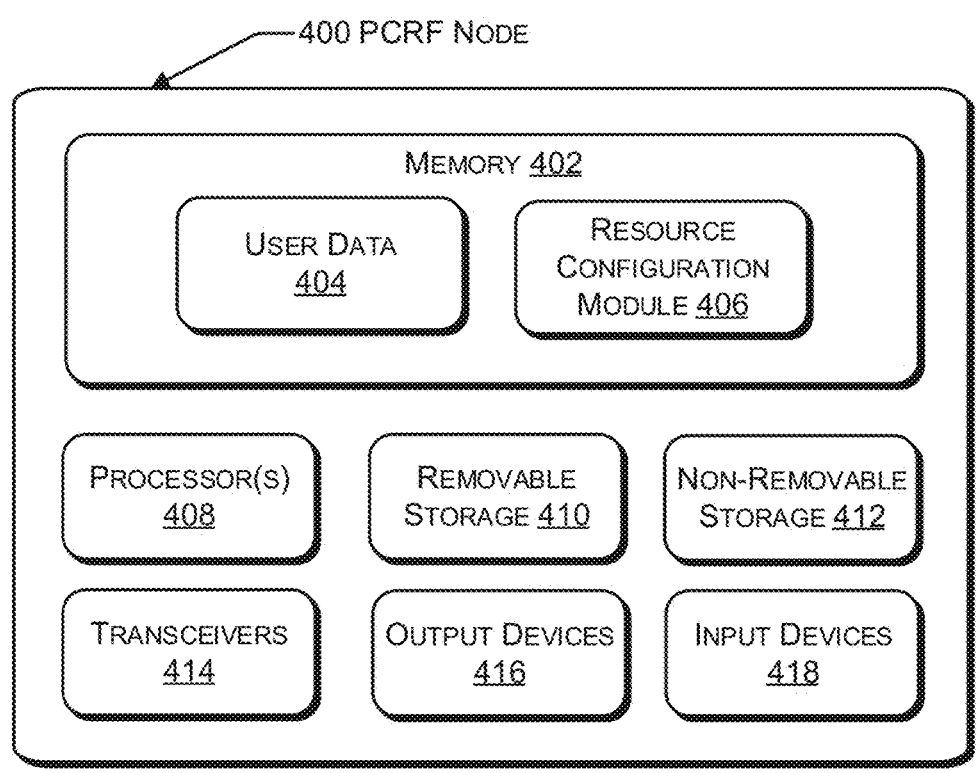
FIG. 4 illustrates a component level view of a policy and charging rules function (PCRF) node configured to receive a quality setting associated with the consumption of video content and, based on the quality setting, instruct a device of the telecommunications network to reduce the network resources available for consumption of video content.

In various implementations, each of the third-party content providers 106, the GGSN/PGW 110, the billing server 120, and the PCRF node 124 may be or include one or more computing devices. Such computing devices may each be or include a server or server farm, multiple, distributed server farms, a mainframe, a work station, a PC, a laptop computer, a tablet computer, an embedded system, or any other sort of device or devices. In one implementation, ones of such computing devices represent a plurality of computing devices working in communication, such as a cloud computing network of nodes. An example billing server 120 is illustrated in FIG. 3 and is described in detail below with reference to that figure. An example PCRF node 124 is illustrated in FIG. 4 and is described in detail below with reference to that figure.

The telecommunications network 108 may be any sort of telecommunications network and may comprise a core network and multiple access networks. Such a core network may include a number of network components providing connectivity between cell sites of the telecommunications network, between cell sites of the telecommunications network and those of other telecommunications networks, and between cell sites and devices of other networks. The core network may support packet-switched communications, circuit-switched communications, or both. Further, the core network may be a System Architecture Evolution (SAE) core network or a universal mobile telecommunication system (UMTS) core network, or may include network components from both. Also, the core network may include an Internet Protocol (IP) Multimedia subsystem (IMS) layer for supporting packet-switched communications. Further, the core network may include the billing server 120, PCRF node 124, and GGSN/PGW 110, as well as other devices.

In some implementations, each access network of the telecommunications network 108 may include a number of base stations associated with a geographic area. Such base stations may be implemented on cell towers and may each be associated with one or more radio access technologies (RATs). A base stations may be, for instance, an eNodeB associated with Long-Term Evolution (LTE) RAT, a Node B associated with Fourth Generation (4G) or Third Generation (3G) RATs (e.g., UMTS or Global System for Mobility (GSM) RATs), or other sorts of base station, such as a base stations associated with Second Generation (2G) RATs.

In various implementations, the user device 102 may include application(s) 104 that are capable of receiving and rendering content. Such application(s) 104 may include those capable of streaming video content, such as a web browser and client applications of various video streaming services (e.g., Netflix™, Hulu™, YouTube™, etc.). Also or instead, the application(s) 104 may include those capable of streaming audio or those capable of downloading and storing video or audio. The content received by the application(s) 104 may be associated with a service quality, such as a content resolution or a data transfer rate at which the content was received. Further, each of the application(s) 104 may offer a provider-specific quality setting (which differs from the user-selected quality setting discussed throughout this disclosure) which may effect the service quality at which the content provider 106 corresponding to that application 104 provides its content.

As illustrated in FIG. 1, the user device 102 may also be configured with a content consumption management module 114. The content consumption management module 114 may monitor execution activities on the user device 102 exposed by an operating system of the user device 102 to determine when the application(s) 104 are receiving or rendering content. Upon determining that an application 104 is rendering content, the content consumption management module 114 may retrieve, at 118, information associated with that content consumption from the telecommunications network 108. For example, the content consumption management module 114 may retrieve indicia of a service quality for content received by the application 104, a content consumption limit associated with a data plan (also referred to herein as a "content consumption plan") of a user of the user device 102, and a content consumption metric for a total amount of content consumed in a time period. In some implementations, the indicia may also include a usage history detailing the user's past content consumption behavior. The content consumption management module 114 may retrieve the indicia from the PCRF node 124 or from the billing server 120. Such retrieval may be responsive to the rendering of content by an application 104 or may be automatic and periodic.

Upon retrieving the indicia, the content consumption management module 114 may determine whether to suggest to the user that the user change a quality setting. The quality setting may specify a service quality for both the content and all other content of a same type as the content, regardless of the providing service or application. In making this determination, the content consumption management module 114 may look to the current service quality associated with the content rendered by the application(s) 104, data plan metrics and limits, usage history, and a device type of the user device 102. This information may be analyzed using a rule set received from the operator of the telecommunications network 108. Such a rule set may be updateable, allowing the operator to dynamically manage its network resources.

For example, the content consumption management module 114 may look at a current service quality, which may be a fairly high data transfer rate, and at the user's data plan limit and metrics and determine that the user will exceed the limit within another hour of content consumption. The content consumption management module 114 may act on this determination by suggesting to the user that the user select a lower quality setting for the service quality, thus obtaining additional time for content consumption before the limit is exceeded. Alternatively, the content consumption management module 114 may also consider a device type and usage history. If the current service quality is the minimal level necessary for a good user experience given the device type, the content consumption management module 114 may refrain from suggesting a quality setting change. Further, if the usage history shows that the user only consumes a single hour of content per plan time period, the content consumption management module 114 may predict only a single hour of content consumption and no change to the quality setting may be necessary. Thus, the content consumption management module 114 may refrain from suggesting one.

In some implementations, the content consumption management module 114 may provide the suggestion to change the quality setting to the user via an overlay user interface. Such an overlay user interface may be provided along with a user interface of the application(s) 104 (e.g., on an edge of the user interface of the application(s) 104). The overlay user interface may include text explaining the suggestion (e.g., "at your current rate of 6 Mbps, we estimate you will exceed your plan limit in one hour—at 1.5 Mbps, we estimate you will have six hours left—would you like to change your quality setting?") and, optionally, a selectable control to effect the change to the quality setting (e.g., a drop down list or the like). In one example, the overlay user interface may offer an option to consume content at a service quality such that the content consumption limit is met, but not exceeded. In further examples, the overlay user interface may provide the user with an option to upgrade his or her plan to enable longer enjoyment of the content at the same service quality.

In further implementations, the settings module 116 may also or instead offer a selectable control to enable the user to effect a change to the quality setting. For example, the settings module 116 may provide a settings user interface that enables the user to select among multiple possible settings for a content type (e.g., high/medium/low for video content). The settings user interface may also include selectable controls for selecting quality settings for other content types (e.g., audio content). The settings module 116 and settings user interface may also enable a user to opt in or out of a program for free or reduced charge data consumption.

In some examples, the settings module 116 or one or more node(s) of the telecommunications network 108 may permit users to effect a change to the quality setting or to other user preferences via various interfaces. Example interfaces can include a Short Message Service (SMS) interface (e.g., text "ON" or "OFF" to 24643 to activate or deactivate downgrading) or an Unstructured Supplementary Service Data (USSD) interface (e.g., dial *66# or #266#, "BON", to activate downgrading and *633# or #263#, "BOF", to deactivate downgrading). In an example, an interface may additionally or alternatively permit users to access saved user preferences. For example, a USSD interface (e.g., dial #264#) can provide information about whether or not downgrading is active. Further example interfaces can include an application 104, an interactive voice-response system, or a Web site provided, e.g., by the operator of the telecommunications network 108. Still further example interfaces can include physical switches or other controls, e.g., provided as part of user device 102, or virtual switches or controls implemented by user device 102 such as a recognition module that updates the quality setting or other user preference according to a swipe gesture received on a touchscreen of the user device 102.

Once the user has changed the quality setting via the overlay user interface or settings user interface, the content consumption management module 114 or settings module 116 will provide, at 118, the quality setting to the billing server 120 or PCRF node 124 for enforcement by the telecommunications network 108.

In various implementations, the PCRF node 124 may receive the quality settings directly from user devices 102 or indirectly from user devices 102, by way of the billing server 120. Such quality settings may be selected by the users, as described above, or may be default quality settings selected for the users. When received indirectly, the billing server 120 will update, at 122, the PCRF node 124 with the quality setting and its associated user device 102 or user. In response to receiving the quality setting, the PCRF node 124 will store the quality setting and instruct, at 126, the GGSN/PGW 110 to allocate, at 128, network resources in accordance with the quality setting. Such allocation may involve, for example, reducing the network resources. Alternatively, the PCRF node 124 may analyze the quality metric to determine would require reduced network resources to be achieved and, in response, may instruct, at 126, the GGSN/PGW 110 to reduce, at 128, the network resources. In some implementations, the PCRF node 124 may receive multiple quality settings for multiple content types for a user or user device 102 and may reduce network resources for some of these content types, but not others. For example, if one content type is offered free of charge to the user, the PCRF node 124 may not instruct the GGSN/PGW 110 to reduce the network resources for that content type.

The effect of the reduced network resources is a reduction in the service quality utilized by the content providers 106. The content providers 106 each tests the network to determine if services are degraded or if there are fewer network resources and, in response to detecting degradation or fewer resources, they lower their service quality levels. In this way, by selecting a quality setting and having the telecommunications network 108 reduce network resources based on that quality setting, the user is able to have the content providers 106 essentially behave as if they are limiting their service quality based on that quality setting.

In various implementations, the operator of the telecommunications network 108 may further seek to reduce the burden placed on its network resources by incentivizing its users to utilize less of those network resources. For example, the operator may provide a program which offers consumption of the content (e.g., video content) free of charge in exchange for the content being provided to the user at a limited service quality. For example, the operator may determine that all video content consumed at a service quality at or less than a specific data transfer rate should be free when the consuming user opts to participate in the program.

When the user participates and the billing server 120 receives notification of consumption of content, the billing server 120 determines the user's participate and conditionally excludes that consumption from a consumption metric. For example, if the user consumes 20 MB of video content at or below the specific data transfer rate, the billing server 120 does not include those 20 MB in a content consumption metric that counts towards a plan limit.

In some implementations, however, the consuming of the video content is not excluded by the billing server 120 from the consumption metric when the consumption limit has been exceeded, regardless of whether the subscriber has elected to participate in the program. Thus, if the user has a limit of 20 GB per month, and the user is at 21 GB when electing to participate in the plan, the user's consumption of content will be included in his or her content consumption metrics unless, for instance, the user upgrades his or her plan and receives a higher limit.

Also, the user may repeatedly opt in and out of participation in the program. Initially, a user may elect to participate, and consumption at the lower service quality is not counted towards the content consumption metric. Later, the user may decide that he or she wishes to consume a program at a higher service rate and opts out of the program. Both consumption of that desired content and other consumption now count towards the content consumption metric. Later yet, the user may wish to again participate in the program, limiting the service quality he or she receives and, again, not having consumption counted towards the content consumption metric.

Illustrative Devices

FIG. 2 illustrates a component level view of a user device 200, which can represent user device 102, configured to monitor a user's content consumption and to suggest a reduced quality setting for that content to avoid exceeding a content consumption limit imposed by the user's data plan. As illustrated, the user device 200 comprises a system memory 202 storing application(s) 204, a content consumption management module 206, a settings module 208, and an operating system 210. Also, the user device 200 includes processor(s) 212, a removable storage 214, a non-removable storage 216, transceivers 218, output device(s) 220, and input device(s) 222.

In various implementations, system memory 202 is volatile (such as RAM), non-volatile (such as ROM, flash memory, etc.), or some combination of the two. The application(s) 204 may be examples of application(s) 104, the content consumption management module 206 may be an example of the content consumption management module 114, and the settings module 208 may be an example of the settings module 116. The operating system 210 may be any sort of operating system and may enable the content consumption management module 206 to discover whether the application(s) 204 are receiving or rendering content, as described above with regard to FIG. 1. Algorithm(s) implemented by the modules 204, 206, and 208 and by the operating system 210 is/are illustrated by the flowcharts shown in FIG. 5.

In some implementations, the processor(s) 212 is a central processing unit (CPU), a graphics processing unit (GPU), or both CPU and GPU, or any other sort of processing unit.

The user device 200 may also include additional data storage devices (removable and/or non-removable) such as, for example, magnetic disks, optical disks, or tape. Such additional storage is illustrated in FIG. 2 by removable storage 214 and non-removable storage 216.

Non-transitory computer-readable media may include volatile and nonvolatile, removable and non-removable tangible, physical media implemented in technology for storage of information, such as computer readable instructions, data structures, program modules, or other data. System memory 202, removable storage 214, and non-removable storage 216 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 200. Any such non-transitory computer-readable media may be part of the user device 200.

In some implementations, the transceivers 218 include any sort of transceivers known in the art. For example, the transceivers 218 may include a radio transceiver that performs the function of transmitting and receiving radio frequency communications via an antenna. Also or instead, the transceivers 218 may include wireless modem(s) to may facilitate wireless connectivity with other computing devices. Further, the transceivers 218 may include wired communication components, such as an Ethernet port, for communicating with other networked devices.

In some examples, transceivers 218, and other transceivers described herein, are included in a network interface that can include at least one transceiver 218. The network interface can other components, e.g., cable or fiber connectors, memory interfaces, processor interfaces, or other structures used in conveying data between processor(s) 212 and a network, e.g., telecommunications network 108 (shown in phantom).

In some implementations, the output devices 220 include any sort of output devices known in the art, such as a display (e.g., a liquid crystal display), speakers, a vibrating mechanism, or a tactile feedback mechanism. Output devices 220 also include ports for one or more peripheral devices, such as headphones, peripheral speakers, or a peripheral display.

In various implementations, input devices 222 include any sort of input devices known in the art. For example, input devices 222 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of a billing server 300, which can represent billing server 120, configured to store indicia of whether a subscriber has elected to participate in a program offering free data consumption and to conditionally exclude content consumption from a content consumption metric based on the indicia. As illustrated, the billing server 300 comprises a system memory 302 storing billing records 304 and a charging module 306. Also, the billing server 300 includes processor(s) 308, a removable storage 310, a non-removable storage 312, transceivers 314, output device(s) 316, and input device(s) 318.

In various implementations, system memory 302 is volatile (such as RAM), non-volatile (such as ROM, flash memory, etc.), or some combination of the two. The billing records 304 may include records for subscribers of the telecommunications network, user devices, or for combinations of subscribers and user devices. Such billing records 304 may include an indication of whether a subscriber or user is participating in a program offering free content consumption at a limited service quality. The billing records 304 may also include any or all of a plan limit on data consumption (e.g., 2 GB per month), a current content consumption metric (e.g., 1 GB for current month), and a service quality of content being consumed by the user of the user device, and a user-selected quality setting. The charging module 306 may determinate whether the user is participating in a free content consumption plan and conditionally exclude consumption from a metric, as described above with respect to FIG. 1. Also, either the charging module 306 or another module of the billing server 300 may provide data from the billing records 304 (e.g., to a PCRF node or user devices) and may update the billing records 304. Algorithm(s) implemented by the charging module 306 is/are illustrated by the flowcharts shown in FIG. 7.

In some implementations, the processor(s) 308 is a central processing unit (CPU), a graphics processing unit (GPU), or both CPU and GPU, or any other sort of processing unit.

The billing server 300 may also include additional data storage devices (removable and/or non-removable) such as, for example, magnetic disks, optical disks, or tape. Such additional storage is illustrated in FIG. 3 by removable storage 310 and non-removable storage 312.

Non-transitory computer-readable media may include volatile and nonvolatile, removable and non-removable tangible, physical media implemented in technology for storage of information, such as computer readable instructions, data structures, program modules, or other data. System memory 302, removable storage 310, and non-removable storage 312 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the billing server 300. Any such non-transitory computer-readable media may be part of the billing server 300.

In some implementations, the transceivers 314 include any sort of transceivers known in the art. For example, the transceivers 314 may include wired communication components, such as an Ethernet port, for communicating with other networked devices. Also or instead, the transceivers 314 may include wireless modem(s) to may facilitate wireless connectivity with other computing devices. Further, the transceivers 314 may include a radio transceiver that performs the function of transmitting and receiving radio frequency communications via an antenna.

In some implementations, the output devices 316 include any sort of output devices known in the art, such as a display (e.g., a liquid crystal display), speakers, a vibrating mechanism, or a tactile feedback mechanism. Output devices 316 also include ports for one or more peripheral devices, such as headphones, peripheral speakers, or a peripheral display.

In various implementations, input devices 318 include any sort of input devices known in the art. For example, input devices 318 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a policy and charging rules function (PCRF) node 400, which can represent PCRF node 124, configured to receive a quality setting associated with the consumption of video content and, based on the quality setting, instruct a device of the telecommunications network to reduce the network resources available for consumption of video content. As illustrated, the PCRF node 400 comprises a system memory 402 storing user data 404 and a resource configuration module 406. Also, the PCRF node 400 includes processor(s) 408, a removable storage 410, a non-removable storage 412, transceivers 414, output device(s) 416, and input device(s) 418.

In various implementations, system memory 402 is volatile (such as RAM), non-volatile (such as ROM, flash memory, etc.), or some combination of the two. The user data 404 may include records for subscribers of the telecommunications network, user devices, or for combinations of subscribers and user devices. Such user data 404 may also include any or all of a plan limit on data consumption (e.g., 2 GB per month), a current content consumption metric (e.g., 1 GB for current month), and a service quality of content being consumed by the user of the user device, and a user-selected quality setting. The resource configuration module 406 may receive quality settings and, based on those settings reduce (or instruct a GGSN/PGW to reduce) network resources available for transmission of content associated with the quality settings, as described above with respect to FIG. 1. Algorithm(s) implemented by the resource configuration module 406 is/are illustrated by the flowcharts shown in FIG. 6.

In some implementations, the processor(s) 408 is a central processing unit (CPU), a graphics processing unit (GPU), or both CPU and GPU, or any other sort of processing unit.

The PCRF node 400 may also include additional data storage devices (removable and/or non-removable) such as, for example, magnetic disks, optical disks, or tape. Such additional storage is illustrated in FIG. 4 by removable storage 410 and non-removable storage 412.

Non-transitory computer-readable media may include volatile and nonvolatile, removable and non-removable tangible, physical media implemented in technology for storage of information, such as computer readable instructions, data structures, program modules, or other data. System memory 402, removable storage 410, and non-removable storage 412 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the PCRF node 400. Any such non-transitory computer-readable media may be part of the PCRF node 400.

In some implementations, the transceivers 414 include any sort of transceivers known in the art. For example, the transceivers 414 may include wired communication components, such as an Ethernet port, for communicating with other networked devices. Also or instead, the transceivers 414 may include wireless modem(s) to may facilitate wireless connectivity with other computing devices. Further, the transceivers 414 may include a radio transceiver that performs the function of transmitting and receiving radio frequency communications via an antenna.

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Illustrative Processes

Figure 5:
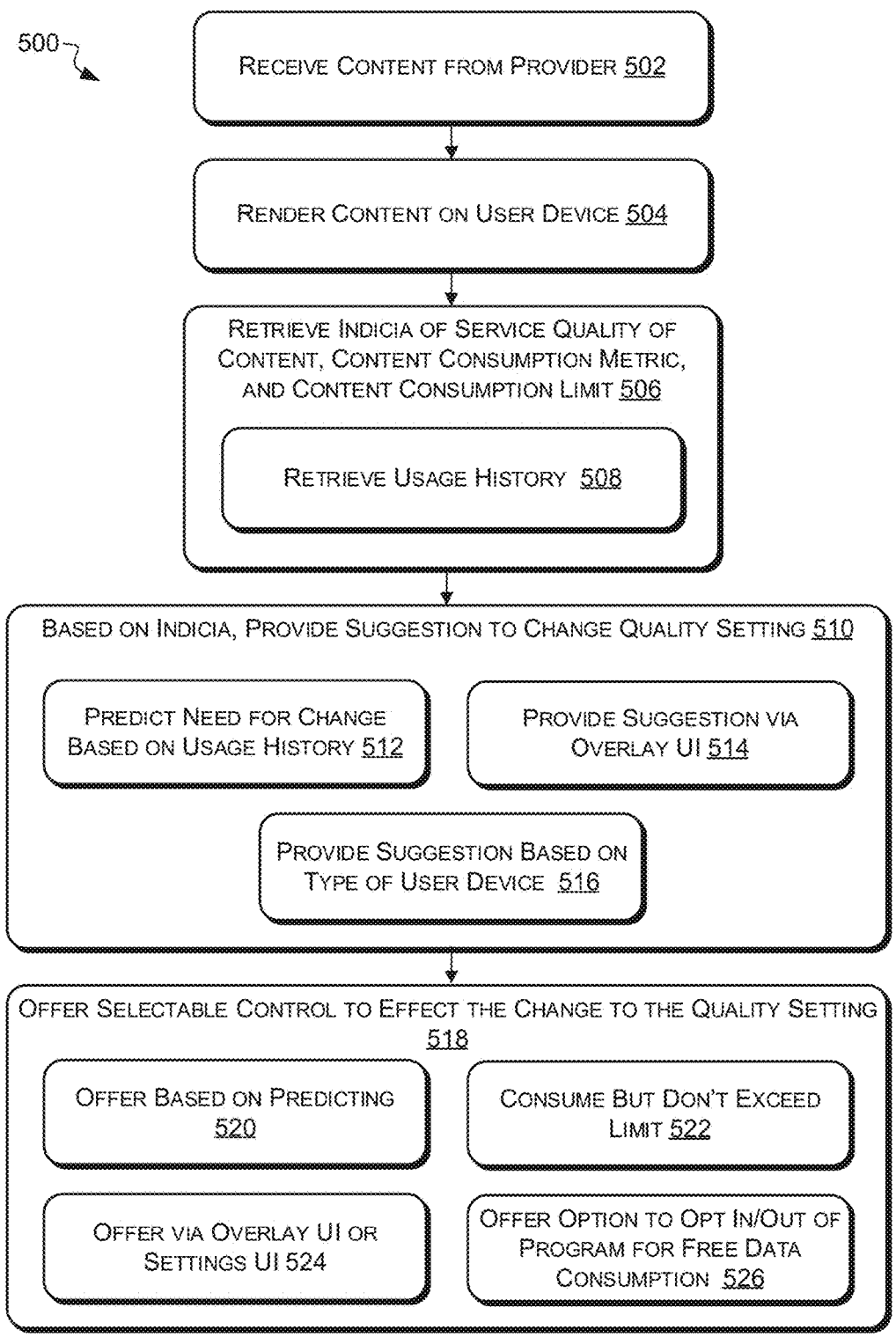
FIG. 5 illustrates an example process for retrieving indicia of a user's content consumption; based on the indicia, providing a suggestion to change a quality setting; and offering a selectable control to effect the quality setting change.
Figure 6:
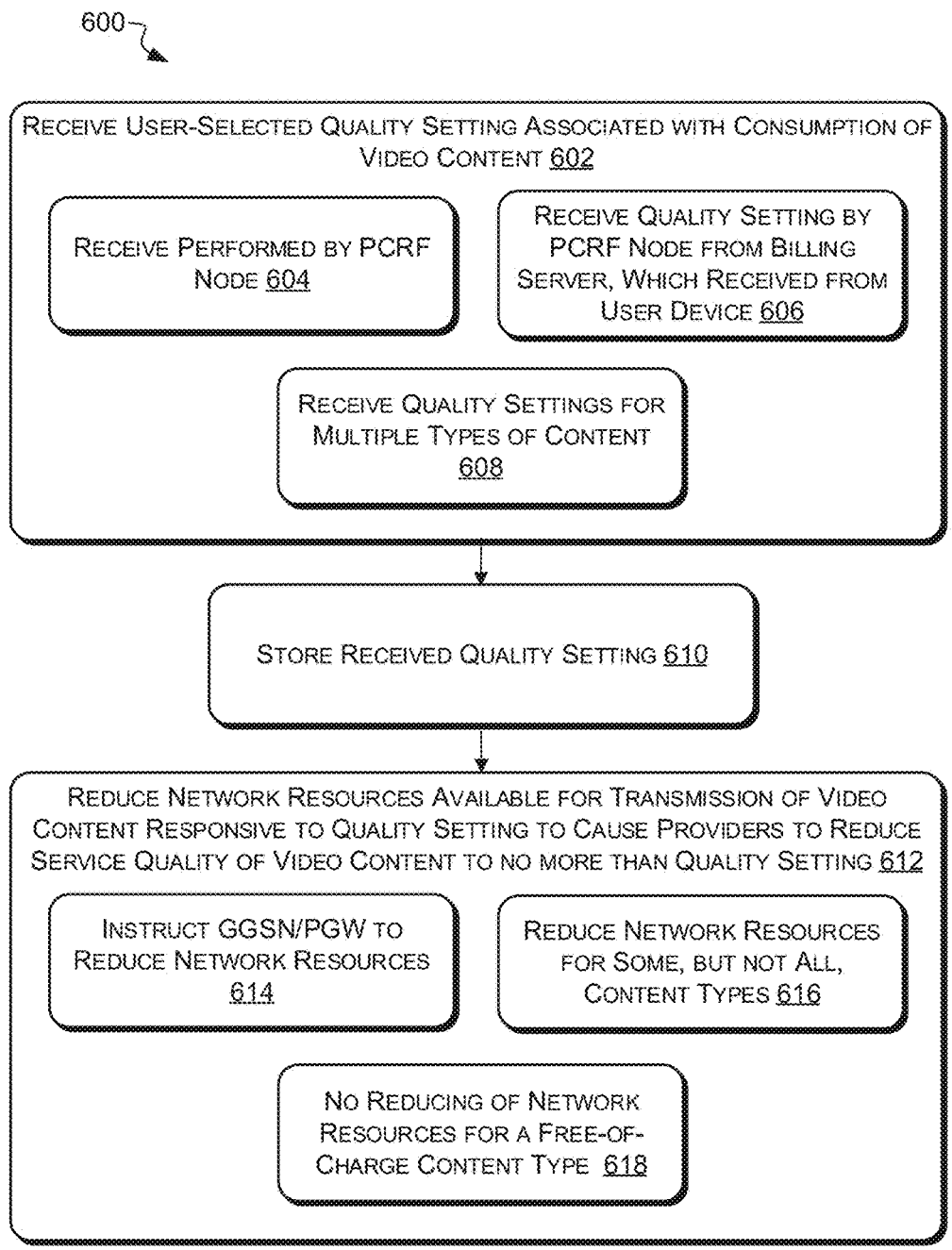
FIG. 6 illustrates an example process for receiving a quality setting associated with consumption of video content by a subscriber of the telecommunications network and reducing network resources available for transmission of video content to the subscriber, thereby causing third-party content providers of video content to reduce a service quality of the video content they transmit to no more than the quality setting.
Figure 7:
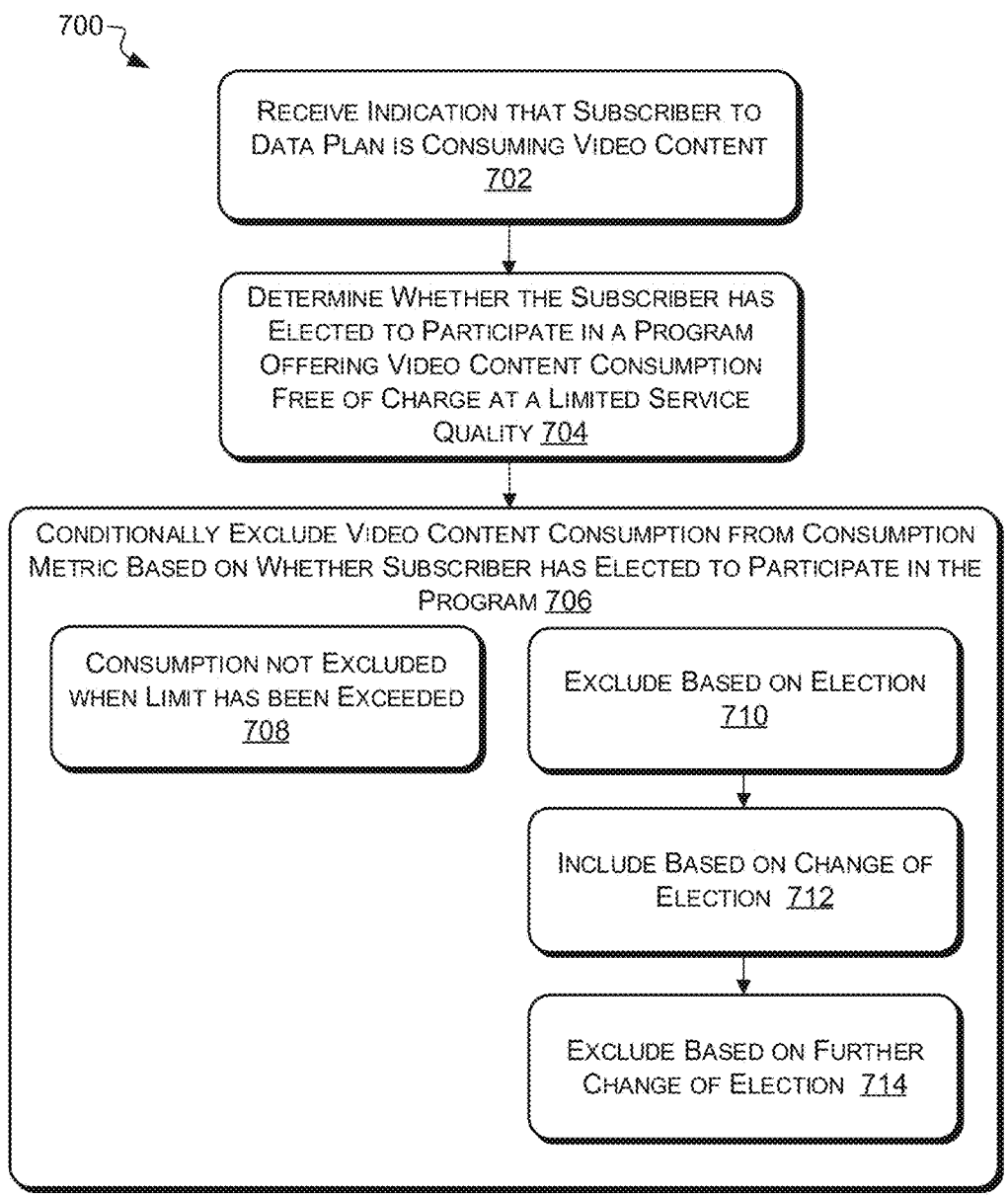
FIG. 7 illustrates an example process for conditionally excluding content consumption from a content consumption metric based on whether a subscriber has elected to participate in a program offering consumption of video content free of charge in exchange for the video content being provided to the subscriber at a limited service quality.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for retrieving indicia of a user's content consumption; based on the indicia, providing a suggestion to change a quality setting; and offering a selectable control to effect the quality setting change. The process includes, at 502, receiving, by a user device, such as the user device 102 or 200, content at an application of the user device. The content is received from a third-party content provider over a telecommunications network.

At 504, the application renders the content at a service quality associated with the received content. The service quality for the content may be one of a resolution of the content or a data transfer rate of the content.

At 506, a content consumption manager module of the user device retrieves indicia of a service quality for content received by the application, a content consumption limit associated with a data plan of a user of the user device, and a content consumption metric for a total amount of content consumed in a time period. The indicia may be retrieved from the telecommunications network (e.g., from a billing server or PCRF node of the telecommunications network) responsive to the content consumption manager module observing that the application is rendering content. At 508, the retrieving may include retrieving a usage history of the user.

At 510, the content consumption manager module provides, based at least in part on the indicia, a suggestion to change a quality setting which specifies the service quality of the content received by the application. Such a quality setting may specify a service quality for both the content and for all other content of a same type as the content, regardless of the providing service or application. At 512, providing the suggestion may include predicting, based on the usage history, whether the user's content consumption will exceed the content consumption limit before an end of the time period and providing a suggestion based on that prediction. At 514, the providing may include providing the suggestion via an overlay user interface. At 516, the providing may include providing the suggestion of the quality setting based at least in part on a device type of the user device.

At 518, the content consumption manager module offers a selectable control to effect the change to the quality setting. At 520, the offering may include offering the selectable control to effect the change based on the predicting at 512. At 522, the offering may include providing an option to consume content at a service quality such that the content consumption limit is met, but not exceeded. At 524, the offering may include offering the selectable control via an overlay user interface or via a settings user interface. At 526, the offering may include providing an option to opt in or out of a data consumption plan that doesn't charge for content consumption at or below a service quality threshold.

FIG. 6 illustrates an example process 600 for receiving a quality setting associated with consumption of video content by a subscriber of the telecommunications network and reducing network resources available for transmission of video content to the subscriber to cause third-party content providers of video content to reduce a service quality of the video content they transmit to no more than the quality setting. The process includes, at 602, receiving, by a device of the telecommunications network, a quality setting selected by a subscriber of the telecommunications network for consumption of video content by the subscriber. The quality setting may either have been selected by the subscriber or may be a default quality setting selected for the subscriber. At 604, the receiving may be performed by a PCRF node of the telecommunications network, such as a PCRF node 124 or 400. At 606, the receiving may comprise receiving the quality setting from a billing server of the telecommunications network, the billing server having received the quality setting from a user device. At 608, the receiving may comprise receiving quality settings associated with consumption of multiple corresponding types of content.

At 610, the device of the telecommunications network, such as a PCRF node 124 or 400, stores the quality setting.

At 612, the device of the telecommunications network, such as a PCRF node 124 or 400, reduces network resources available for transmission of the video content to the subscriber. This reduction causes third-party content providers of video content to reduce a service quality of the video content they transmit to no more than the quality setting (e.g., limit to no more than 1 mbps). The third-party content providers reduce the service quality in response to testing the telecommunications network and determining, based on the testing, that the network resources are reduced. At 614, the reducing may comprise instructing a GGSN or a PGW to reduce the network resources available for the transmission of the video content. At 616, the reducing may comprise reducing network resources responsive to some, but not all, of the quality settings when quality settings for multiple types of content are received. At 618, the reducing may include not reducing network resources responsive to receiving quality settings associated with consumption of content for which the telecommunications network does not charge.

FIG. 7 illustrates an example process 700 for conditionally excluding content consumption from a content consumption metric based on whether a subscriber has elected to participate in a program offering consumption of video content free of charge in exchange for the video content being provided to the subscriber at a limited service quality. The process includes, at 702, a billing server of a telecommunications network, such as billing server 120 or 300, receiving an indication that a subscriber to a data plan is consuming video content.

At 704, the billing server determines whether the subscriber has elected to participate in a program offering consumption of the video content free of charge in exchange for the video content being provided to the subscriber at a limited service quality.

At 706, the billing server conditionally excludes the consuming of the video content from a consumption metric of the data plan that is associated with a consumption limit based at least in part on whether the subscriber has elected to participate in the program. At 708, the consuming of the video content is not excluded from the consumption metric when the consumption limit has been exceeded, regardless of whether the subscriber has elected to participate in the program. Further, the conditional excluding may include, at 710, excluding the consuming of the video content from the consumption metric based on the subscriber electing to participate in the program; at 712, including further consumption of video content in the consumption metric based on the subscriber changing the election to not participate in the program; and, at 714, excluding further consumption of video content from the consumption metric based on the subscriber changing the election to participate in the program again.

Further Illustrative Devices

Some examples such as those described above with reference to FIG. 1 reduce network resources (operation 128). For example, operation 128 may include reducing throughput for a video connection to 1.5 Mbps. Such a rate can support, e.g., 480p video with codecs such as H.264, but not higher resolutions using such codecs. Therefore, after the beginning of playback of a content item having a resolution higher than a resource-limited connection can support, a content provider 106 may detect increased packet loss or buffering over the reduced network resources. The content provider, in response, may downgrade content bandwidth, e.g., from 1080p to 480p video. The downgrading may include, e.g., at least one of changing compression parameters, changing compression techniques, or changing the spatial or temporal resolution of content. In some examples, this processing by the content provider 106 may cause a delay between when the user applies a quality setting and when the content provider downgrades the content.

In some examples described below, content provider(s) 106 can receive information about a quality setting or other user preference from an operator of the telecommunications network 108. This can permit a content provider 106 to downgrade content bandwidth before transmitting. This can reduce bandwidth consumption over network link(s) between the content provider 106 and the telecommunications network 108. This can also improve the user experience by reducing delay or stuttering of a content stream that may occur during a downgrade that takes place after playback begins.

Figure 8:
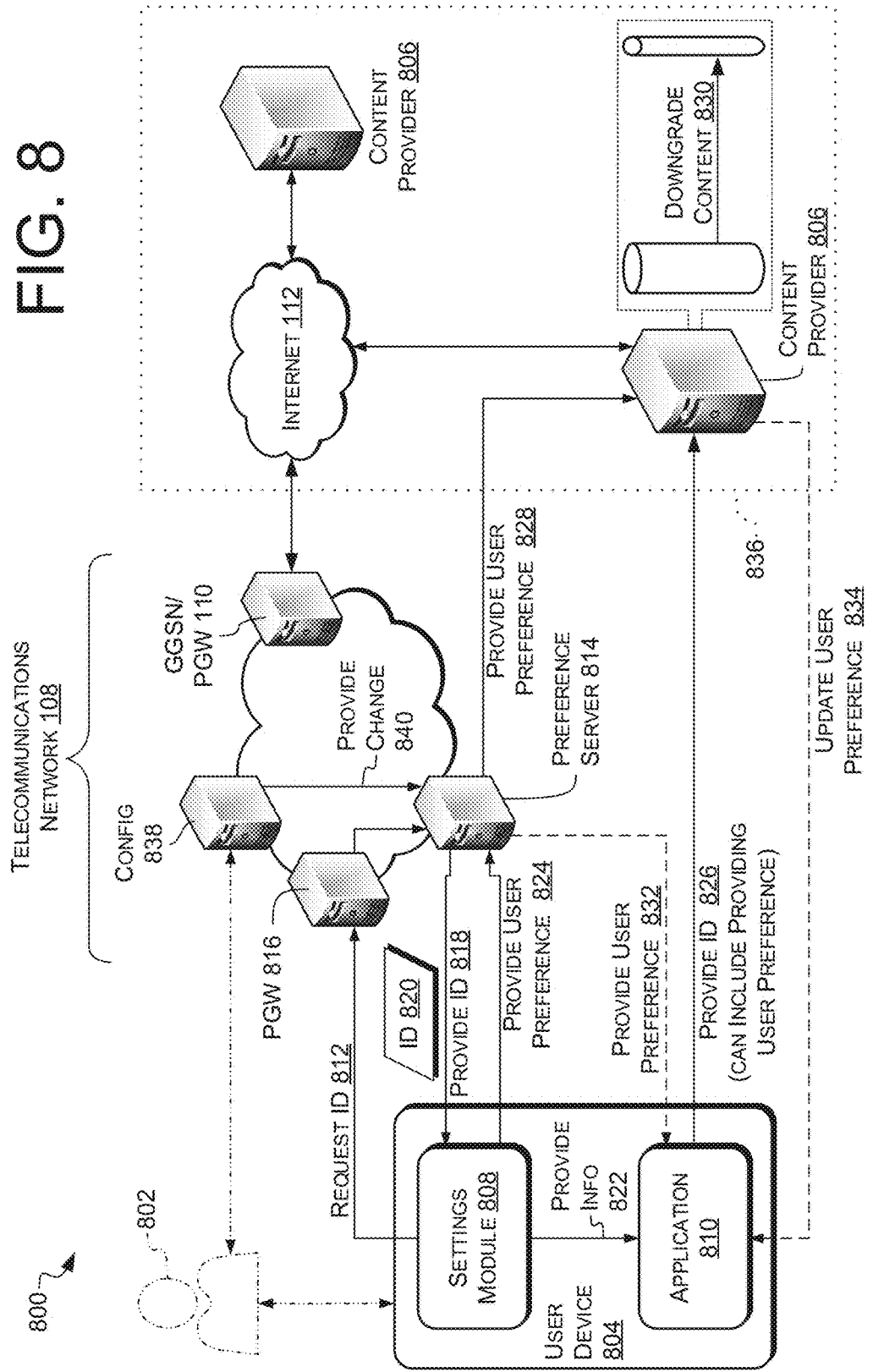
FIG. 8 illustrates an overview and example environment, including a user device, devices of a telecommunications network, and content providers, various illustrated components configured to communicate information about user preferences.

FIG. 8 illustrates an overview and example environment 800, including a user device, devices of a telecommunications network, and content providers. In some examples, the content providers manage content provider services based on a user preference such as a user-selected quality setting. The same numbers are used for components described above with reference to FIGS. 1-7. In some examples, a user or other entity 802 can operate a user device 804. In some examples, user device 804 can communicate with at least one content provider 806, which can represent content provider 106, via telecommunications network 108, GGSN/PGW 110, and Internet 112 (intermediate links omitted from the drawing for clarity). Two content providers 106 are shown; in some examples, user device 804 can communicate with at least one content provider 106.

In some examples, the user device 804 includes a settings module 808, which can represent settings module 116. As described above with reference to settings module 116, settings module 808 may present a selectable control to enable the user to effect a change to the quality setting or another user preference, or otherwise determine a user preference or permit to determine a user preference. In other examples, entity 802 may determine a user preference via an interface not shown, e.g., a touch-tone telephone interface or a Web-browser interface on a desktop computer. In some examples, user device 804 can include at least one application 810, which can represent application(s) 104, configured to receive content from content providers 106 over the telecommunications network 108.

In some examples, at 812, user device 804 can request a pseudonymous identifier from a preference server 814, which can represent, e.g., billing server 120. The preference server 814 can include or represent, e.g., a Home Subscriber Server (HSS) or Home Location Register (HLR), a profile server, or another server or node configured to provide pseudonymous identifiers or maintain user preference data. In some examples, preference server 814 can communicate with at least one of user device 804 or content provider 106 via at least one of telecommunications network 108, a PGW 816 (discussed below), GGSN/PGW 110, or Internet 112 (some intermediate links omitted from the drawing for clarity).

For example, the user device 804 can issue an API call to preference server 814, e.g., via a GET or POST to an HTTP or HTTPS endpoint. The parameters or results of the API call can be encapsulated, e.g., application/x-www-form-urlencoded, multipart/form-data, Extensible Markup Language (XML), or JavaScript Object Notation (JSON) formats. In some examples, the API can be a Representational State Transfer (REST), Web Services, Remote Procedure Call (RPC), or other API. In the illustrated example, the settings module 808 can issue the API call.

In the illustrated example, a node of the telecommunications network 108, illustrated as PGW 816 in a nonlimiting example, can proxy or otherwise convey the request to the preference server 814. The PGW 816 can modify or annotate the request to indicate or include identity information associated with the user device 804. For example, the PGW 816 can add an HTTP or Session Initiation Protocol (SIP) header to the request including identification information such as, or based at least in part on, at least one of: a terminal identifier such as an international mobile equipment identity (IMEI); a user identifier such as an international mobile subscriber identity (IMSI); a network identifier such as a mobile country code (MCC) and a mobile network code (MNC); a user address such as an E. 164 international-dialing-plan telephone number, mobile station international subscriber directory number (MSISDN), SIP Uniform Resource Identifier (URI), or network address, such as an Internet IPv4 or IPv6 address; a country code, e.g., indicating a country in which the user device 804 is located; a cell identifier; or an internal identifier such as an IMS Charging Identity (ICID). In some examples, the PGW 816 or another component, e.g., a SIP proxy, of telecommunications network 108, can add a P-Access-Network-Info, P-Charging-Vector, P-Asserted-Identity, or other header including one or more of the above items. Annotating the request at the node, e.g., PGW 816, can permit the preference server 814 to provide appropriate pseudonymous identifiers even in the event of failures or improper functioning of the user device 804.

In some examples, at 818, user device 804 can retrieve the pseudonymous identifier 820 ("ID") from the preference server 814. The pseudonymous identifier can include, e.g., a globally unique identifier (GUID), universally unique identifier (UUID), a hash value such as a hash provided by the Secure Hash Algorithm (SHA)-2 or SHA-3 standards, the output of an encryption algorithm such as Advanced Encryption Standard (AES), or a combination of all or part of any of those. In some examples, the preference server 814 can determine the pseudonymous identifier based at least in part on at least one of the values of identify information described above with reference to the PGW 816. For example, the preference server 814 can determine the pseudonymous identifier as a hash of the MSISDN or of the MSISDN plus cryptographic salt. In other examples, the preference server 814 can determine the pseudonymous identifier as a version-1 GUID based on a Media Access Control (MAC) address, or as a version-5 UUID determined partly by hashing at least part of the identity information, e.g., using the SHA-1 has algorithm.

In some examples, the user device 804 can request, or the preference server 814 can determine, a single identifier for a particular user device 804, or multiple identifiers per user device 804. In some examples, one pseudonymous identifier can be determined per application 810, per session (e.g., the pseudonymous identifier changes after the user device 804 reboots or loses network service), or per content connection. This can permit providing user preferences to content providers 106 without sharing personally-identifiable information of users such as entity 802. In some examples, the pseudonymous identifier can be determined from the identity information in a repeatable manner so that the preference server 814 does not have to store the mapping from identity information to pseudonymous identifier. Not storing a mapping can provide increased security by removing the opportunity to gain unauthorized access to such a mapping.

In some examples, pseudonymous identifiers are associated with accounts maintained by or with the operator of telecommunications network. For example, an account may be associated with a specific MSISDN (phone number), and with one or more phones or other user devices 804 that are configured to ring when a call is placed to that MSISDN. In some examples, each account is associated with a single user. In some examples, multiple users are associated with one account. In some examples, accounts can include or be associated with other accounts. In some examples, the pseudonymous identifier permits reliably distinguishing accounts from each other without revealing to content provider(s) 106 the identities of the accounts or account holders. For example, one or many pseudonymous identifiers may map to a single account, and a single pseudonymous identifier does not map to more than one account.

In the illustrated example, the preference server 814 provides the pseudonymous identifier 820 to the user device 804, e.g., directly. In some examples, the preference server 814 provides the pseudonymous identifier 820 to the user device 804, e.g., via PGW 816 or other intermediary network devices, e.g., routers, switches, or proxies.

In some examples, at 822, settings module 808 can provide information to the application 810. Operation 822 can be performed, e.g., in response to a request from application 810, according to stored rules of the settings module 808, in response to receipt of the pseudonymous identifier 820 provided at operation 818, or at other times. The information can include, e.g., at least one of the pseudonymous identifier 820 or a user preference.

In some examples, application 810 can request or receive the pseudonymous identifier 820 without involvement of the settings module 808. For example, the application 810 can transmit a request to PGW 816, e.g., as discussed herein with reference to operation 812. In some examples, the application 810 can receive the pseudonymous identifier 820 from preference server 814, e.g., as discussed herein with reference to operation 818. In some examples, the application 810 can receive the pseudonymous identifier 820 directly, then can query the settings module 808 for user preferences.

In some examples, at 824, settings module 808 can provide an indication of the user preference to the preference server 814. The indication can be accompanied by the pseudonymous identifier provided at operation 818. Operation 824 can include the settings module 808 pushing the user preference to the preference server 814, or the preference server 814 requesting (pulling) the user preference from the settings module 808. In some examples, the preference server 814 can store the user preference information in association with the pseudonymous identifier provided at operation 818. In some examples, operation 824 can be repeated at least one time in response to a change in the user preference, e.g., via a user interface provided by the settings module 808. For example, whenever a user preference changes, the user device 804 can provide the changed preference information and the pseudonymous identifier to the preference server 814.

In the illustrated example, the preference server 814 both provides pseudonymous identifiers (operation 818) and stores user preference information (operation 824). In other examples, a first node of the telecommunications network 108 can provide the pseudonymous identifiers, and a second, different node of the telecommunications network 108 can store the user preference information.

In some examples, at 826, the application 810 provides an indication of the pseudonymous identifier 820 to a corresponding content provider 106. For example, when a video-player application 810 initializes and connects to a content provider 106, the application 810 can transmit the pseudonymous identifier to the content provider 106. In some examples, the application 810 can transmit to the content provider 106 one or more request(s) for content, individual request(s) of the one or more request(s) including respective pseudonymous identifier(s).

In some examples, at 828, the preference server 814 can provide an indication of the user preference, e.g., a quality setting, to the content provider 106. In some example, operation 828 can include providing the pseudonymous identifier 820 or an indication thereof in association with the indication of the user preference. In some examples, operation 828 can occur before, during, after, in parallel or sequence with, or in any temporal relationship with operation 826. For example, the preference server 814 can provide the user preference to the content provider 106 in response to operation 824 or on request by content provider 106.

In some examples, the content provider 106 can receive the pseudonymous identifier (operation 826) and then query the preference server 814 for the user preference (operation 828). In further examples, the preference server 814 can provide an indication of the pseudonymous identifier in association with an indication of the user preference to the content provider 106, e.g., in response to a request by the content provider 106 or as a push not expressly requested by the content provider 106. In still further examples, preference server 814 can expose an API, e.g., via secure HyperText Transfer Protocol (HTTPS) or other protocols, and the content provider 106 can issue an API call to retrieve the user preference corresponding to the pseudonymous identifier provided at operation 826.

In some examples, at 830, the content provider 106 can adjust operations in response to the user preference. In the illustrated nonlimiting example, in response to a quality setting received at operation 828, the content provider 106 can downgrade video content, e.g., as described above.

In some examples, operation 828 can be performed in response to operation 824. For example, whenever a user preference is established or changed, preference server 814 can push indications of the preference and the pseudonymous identifier to at least one content provider 106. In some examples, preference server 814 can store address or other information of at least one content provider 106, e.g., a plurality of content providers 106. The preference server 814 can push preferences and pseudonymous identifiers to at least one of the content providers 106 without regard to whether the user device 804 is currently communicating with those content providers 106. This can increase efficiency of the telecommunications network 108 by removing the need for the telecommunications network 108 to inspect packets and determine with which content providers 106 connections are currently active.

In some examples, push notifications can be transmitted only for user-preference changes satisfying predetermined criteria. For example, if a user quality setting is changed to indicate that content should not be downgraded, the preference server 814 can push notification of that change. However, if the user quality setting changes to indicate that content should be downgraded, the preference server 814 can omit the push notification, for example.

Push notification to content providers 106 can further permit content providers to adjust operations (operation 830), e.g., in response to changes to the user preference between or during a session, e.g., a video-streaming session. For example, a user watching a low-resolution video may decide during the video to switch to a higher-resolution video, and may direct a corresponding preference change as described above. The preference server 814 can then provide the changed preference to the content provider 106, which can upgrade the video without interrupting playback, or with little disruption to playback compared to stopping and restarting playback, in some examples. Similarly, a user preference change to select downgraded playback can be pushed from preference server 814 to content provider(s) 106 to cause downgrading, e.g., during or between playback.

In some examples, at 832 (shown dashed for clarity), the preference server 814 can provide an indication of user preference(s) to the application 810 running on user device 804. For example, the application 810 can query the preference server 814 to determine the user preference, e.g., via an HTTPS REST API call or other API. The query can include the pseudonymous identifier 820. In some examples, the preference server 814 can push the user preference information to the application 810.

In some examples, operation 826 can further include transmitting, by application 810, an indication of the user preference received at operation 832 in association with the pseudonymous identifier 820. This can permit content provider 106 to receive the user preference information directly via the application 810, e.g., in the event of a network connectivity failure between content provider 106 and preference server 814.

In some examples of operation 832, the query can include the pseudonymous identifier 820, and the preference server 814 can retrieve the user preference using the pseudonymous identifier 820. Additionally or alternatively, in some examples of operation 832, the query can pass through PGW 816 or another node that annotates the query with identity information, e.g., as described above with reference to operation 812. The preference server 814 can retrieve the user preference using the identity information. In some examples, at operation 832, the preference server 814 can provide the pseudonymous identifier, or both the pseudonymous identifier and the preference information, to the application 810. This can permit the application 810 to determine the pseudonymous identifier without requiring communication between the application 810 and the settings module 808.

In some examples, at 832, the application 810 can provide a query with no parameters, e.g., an HTTP GET or POST request to a predetermined Uniform Resource Locator (URL) with a null or absent "query" URL portion. Examples of such URLs include "https://example.com/endpoint" and "https://example.com/endpoint?". The PGW 816 or other node of the telecommunications network 108 can annotate the query with the identity information. The preference server 814 can determine the pseudonymous identifier based on the identity information and respond to the query with the pseudonymous identifier. In some examples, the preference server 814 can further respond to the query with the preference information. In some examples, the preference server 814 can include only preference information (if any) satisfying predetermined criteria. For example, if a user quality setting indicates content should be downgraded, the preference server 814 can respond to the query with the pseudonymous identifier but not the quality setting. If the user quality setting indicates content should not be downgraded, the preference server 814 can respond to the query with the pseudonymous identifier and also the quality setting, in this example.

In some examples, at 834, a content provider 106 can provide application 810 with updated information regarding a user preference. For example, in response to a preference update pushed by preference server 814 (operation 828), content provider 106 can push information of the preference update to the application 810. This can happen, for example, during streaming of a video or another type of content session.

In some examples, a third-party video content provider or other content provider 106 can check the status of a service-offering preference of a subscriber (e.g., entity 802) to telecommunication services by requesting user preference information, e.g., stored in a subscriber profile, from the telecommunication service provider at the time of video content provisioning session setup. To do so, the third-party video content provider 106 may make an API call (at operation 828) to a subscriber profile system (preference server 814) of the telecommunication service provider. In some examples such as free-consumption programs described above, e.g., with reference to FIG. 1, 3, or 7, the user preference can indicate whether the user has opted to enable or disable the free-consumption program. The third-party video content provider 106 may receive the indication and adapt its streaming accordingly (e.g., lower bandwidth for free consumption than for non-free consumption).

In some examples, an application 810 or an application 104, FIG. 1, may not be configured to provide a pseudonymous identifier (operation 826). For example, a particular version of the application 810 may be configured to perform operation 826, but an older version installed on user device 804 may not be configured to perform operation 826. Additionally or alternatively, the user may not have established a user preference. In some examples, if a user preference is not obtainable, e.g., due to an old app version or a missing preference, a content provider 106 can use a stored default preference established by the content provider 106 independently or by agreement with the operator of telecommunications network 108. For example, if a quality setting is not available or cannot be retrieved for a particular content stream, the content provider 106 can default to downgrading (operation 830), e.g., 480p video instead of 1080p video. In some examples, the content provider 106 can store an internal database (not shown) of user preferences, keyed by pseudonymous identifier. The content provider 106 or the application 810 can query the internal database using the pseudonymous identifier, e.g., to determine stored (e.g., cached) user preference information.

In some example, request to API(s) described herein can require one or more credential parameters in addition to any other parameters described herein. Credential parameters can be carried, e.g., in custom headers or URL query or fragment portions. Credential parameters can be used to establish authentication of nodes making API calls or authorization for nodes to make those calls. For example, preference server 814 can reject API calls from application 810 or content provider 106 unless those calls include a cryptographic signature, message authentication code, or other credential indicating that the party making the API call is authorized to make the API call.

In some examples, individual content providers 106 can be assigned respective unique access keys by the operator of the telecommunications network. Each unique access key can include, e.g., a respective shared secret. In some examples, the credential can include a hash of the data of the API call and of the unique access key. In some examples, the credential can include a value, e.g., a copy of the data of the API call, encrypted (e.g., using AES) using as the key the unique access key or another shared secret. The preference server 814 can validate the API call using a stored copy of the unique access key or shared secret. In some examples, the preference server 814 can limit the rate of incoming requests, e.g., to reduce vulnerability to denial-of-service attacks. In some examples, the preference server 814, in its interactions with user device(s) 804 or content provider(s) 106, can use per-message serial numbers, message-authentication codes, symmetric or asymmetric cryptography, or other cryptographic techniques to provide authentication or encryption of messages transmitted or received via a network such as the telecommunications network 108.

In some examples, a system as described herein includes at least one component shown in box 836. In some examples, a system as described herein excludes the components shown in box 836 and is communicatively connected with at least one of the components shown in box 836.

In some examples, the application 810 can be configured to stream videos or otherwise receive content in ways that reduce bandwidth requirements. In some examples, instead of or in addition to application 810, other component(s) of the user device 804, e.g., an operating system or network stack thereof, can be configured as described in some examples below.

In some examples, the application 810 can operate using a read-ahead buffer size determined based at least in part on a user preference. For example, in response to user preference indicating downgrading, application 810 can operate using a reduced read-ahead buffer size compared to non-downgrading conditions. The read-ahead buffer size can be, e.g., 18 MB for full quality (e.g., 1080p) and 4 MB for limited quality e.g., 480p). Reducing the read-ahead buffer size in response to a limited-quality user preference can reduce data consumption of video that may not be viewed after it is retrieved by the user device 804, while still providing adequate buffer time to accommodate typical network lags and delays.

In some examples, the read-ahead buffer is filled as quickly as possible when video playback or other content streaming begins. This can reduce the loading time required before playback begins, improving user experience. This can also permit effectively using the network, e.g., by permitting relaxing latency tolerances on the portions of the telecommunications network 108 delivering the content while still maintaining smooth playback for the user. Relaxing latency tolerances can in turn permit more effectively using the capacity of telecommunications network 108.

In some examples, application 810 is configured to successively stream multiple content items. For example, a music player may stream an entire album one track at a time. In some examples, streaming of each content item in a sequence, or in a particular session, can begin with a low-quality setting, then upgrade to a higher-quality setting if (1) user preferences indicate that a higher-quality setting is desirable; and (2) network performance indicates that the higher-quality setting is achievable. In some prior schemes, by contrast, each content item after the first begins playback at the highest quality level from the preceding content item. This can lead to packet loss or network congestion if network conditions have changed (e.g., due to cellular roaming) between the playback of one content item and the next.

In some examples, a configuration device 838, e.g., a server or other network-capable device, can be configured to receive changes to user preferences. For example, the configuration device 838 can interact with entity 802, e.g., a user, via a user interface, and receive user instructions to change user preferences. In some examples, the configuration device 838 can include, e.g., a Web server, interactive voice-response system, SMS gateway, or USSD server.

In some examples, at 840, the configuration device 838 can provide information of the change to the user preference to the preference server 814. For example, the configuration device 838 can transmit the information via network 108. In some examples, in response to the change, the preference server 814 can carry out at least one of operations 828 or 832. This can permit preference changes to take effect more quickly.

In some examples, computing devices shown in FIG. 8, e.g., user device 804, preference server 814, PGW 816, configuration device 838, or content provider 106, can include one or more processors, memories, input devices, output devices, or other components discussed above with reference to FIGS. 2-4.

Further Illustrative Processes

Figure 9:
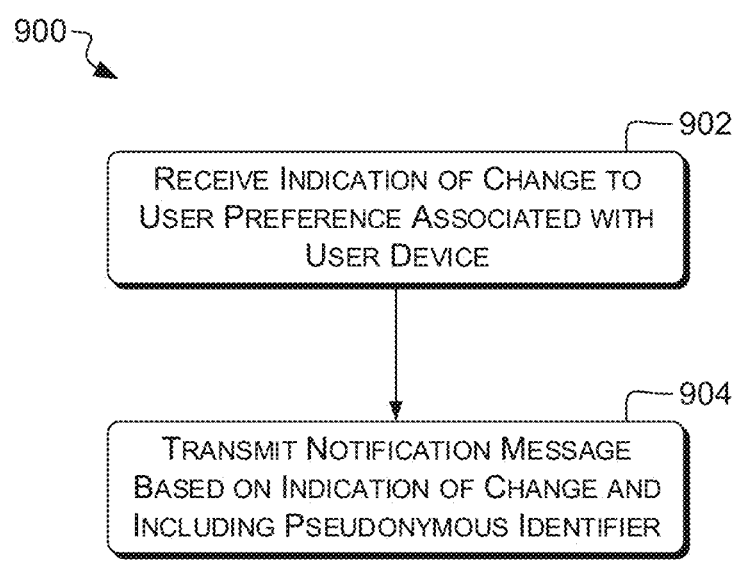
FIG. 9 illustrates an example process for responding to changes in user preferences.

FIG. 9 illustrates an example process 900 for responding to changes in user preferences. In some examples, process 900 can be carried out by a core network device of a telecommunications network communicatively connectable with a user device, e.g., a preference server 814. In some examples, process 900 can be carried out by a content provider 106.

Example functions shown in FIG. 9 and other flow diagrams and example processes herein can be implemented on and/or otherwise embodied in one or more computing device(s), e.g., a computing device 804, 814, 816, 106, or 110, e.g., using software running on such device(s). For the sake of illustration, the example process 900 is described below with reference to components shown in FIG. 1-4 or 8 that can carry out and/or participate in the steps of the example method. However, other component(s), e.g., processing unit(s), can carry out step(s) of described example processes such as process 900; that is, example method(s) shown in FIG. 9 are not limited to being carried out by the identified components. Similarly, example method(s) shown in FIGS. 10-16 are also not limited to being carried out by any specifically-identified components.

The order in which the operations are described in each example flow diagram and/or process is not intended to be construed as a limitation, and any number of the described operations can be combined in any order and/or in parallel to implement each process, except when otherwise specified, or in specific nonlimiting examples in which data produced in an earlier operation is used in a later operation. In each flow diagram, fewer than all of the depicted operations can be performed, except as expressly noted. Moreover, the operations in each of FIGS. 9-16 can be implemented in hardware, software, and/or a combination thereof. In the context of software, the operations represent computer-executable instructions that, when executed by one or more processors, cause one or more processors to perform the recited operations. In the context(s) of firmware and/or hardware, the operations represent logic functions implemented in circuitry, e.g., datapath-control and finite-state-machine sequencing functions. Therefore, descriptions of operations below also describe such software, firmware, and/or hardware structures to carry out the described functions. For example, modules of devices shown in FIG. 8 can perform functions described with reference to the flowcharts. Moreover, operations discussed in FIGS. 8-16 with reference to a single preference can be performed separately for each of multiple user preferences, or with respect to a set of user preferences in place of a single user preference.

In some examples, at 902, an indication of a change to a user preference associated with the user device 804 can be received. The indication can be received, e.g., via a network interface, e.g., including at least one transceiver 218, 314, or 414. The indication can include, e.g., data indicating a name of the user preference and a value of the user preference. In some examples, the user preference can include a quality setting, or an indication of whether the user wishes to participate in a program for free or reduced charge data consumption, e.g., as described herein. Examples are discussed above, e.g., with reference to preference server 814 or operations 824 or 840.

In some examples, the indication of the change can include a pseudonymous identifier 820, e.g., as discussed above, though this is not required. In some examples, the indication of the change including the pseudonymous identifier 820 can be received, e.g., by a content provider 106.

In some examples, at 904, a notification message can be transmitted via the network interface. Examples are discussed above, e.g., with reference to operations 828, 832, or 834. For example, the notification message can be transmitted to a content provider 106. The notification message can include a pseudonymous identifier 820, e.g., as discussed above. For example, the notification message can include the pseudonymous identifier 820 included in or with the indication of the change. The notification message can be based at least in part on the indication of the change. For example, the notification message can include at least part of the indication of the change or a value determined therefrom. In some examples, block 904 can include determining the notification message including data corresponding to the indication of the change.

In some examples, block 904 can include transmitting a plurality of notification messages, e.g., to respective content providers 106. The notification messages can include respective pseudonymous identifiers 820. At least one, e.g., each, of the plurality of notification messages can be based at least in part on the indication of the change. For example, preference server 814 can store identification information of a plurality of content providers 106. Preference server 814 can notify at least one, e.g., each, of the plurality of content providers 106 about changes to user preferences. This can reduce system complexity and resource consumption by removing the need for telecommunications network 108 to track, or preference server 814 to store, information about which user devices 804 are communicating with which content providers 106 at any given time.

Figure 10:
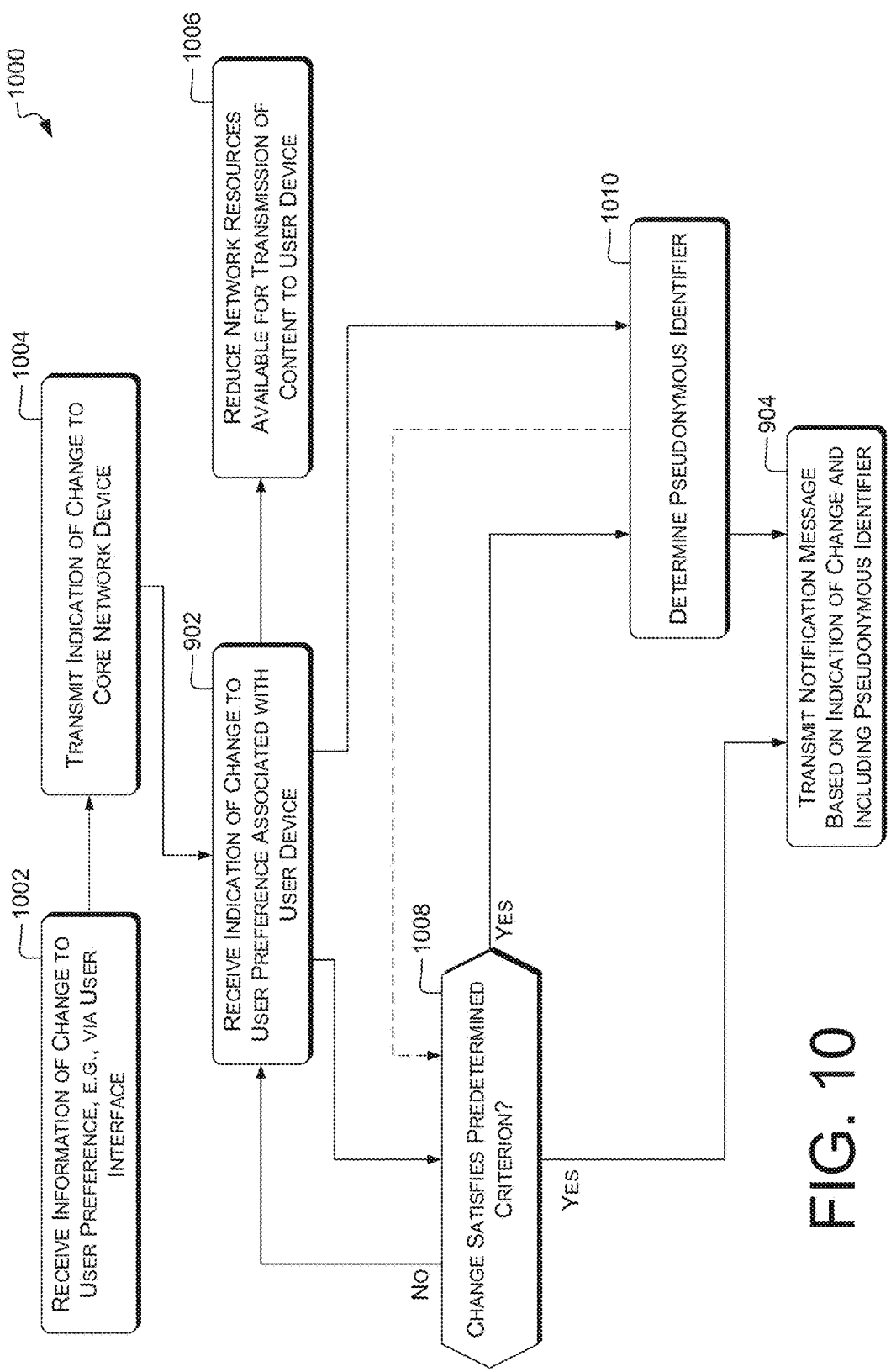
FIG. 10 illustrates an example process for responding to user preferences or changes to user preferences.

FIG. 10 illustrates an example process 1000 for responding to user preferences or changes to user preferences. In some examples, block 902 can be preceded by blocks 1002 or 1004, or followed by block 1006, block 1010, or decision block 1008.

In some examples, at 1002, information of the change to the user preference can be received, e.g., via a user interface. Examples are discussed above, e.g., with reference to the configuration device 838. For example, the user interface can include a textual, graphical, or telephone-keypad-based interface.

In some examples, at 1004, the indication of the change can be transmitted to the core network device. Examples are discussed above, e.g., with reference to operation 840.

In some examples, at 1006, e.g., in response to the change to the user preference received at block 902, a node of the telecommunications network 108, e.g., GGSN/PGW 110, can reduce network resources available for transmission of content to the user device. Examples are discussed above, e.g., with reference to GGSN/PGW 110 or FIG. 6. For example, reducing network resources can reduce negative effects on the network 108 in the event that a content provider 106 should malfunction or suffer a security breach.

In some examples, at 1008, it can be determined whether the change satisfies a predetermined criterion. If so, the next block can be block 904 (or block 1010, discussed below) so that, in response to the change satisfying the criterion, the notification message is transmitted. If not, the next block can be bock 902, and another change can be awaited. In some examples, decision block 1008 can include testing the change against multiple criteria and, e.g., causing the notification message to be transmitted if the change passes all the criteria, a majority of the criteria, or at least one of the criteria, e.g., according to a stored acceptance strategy.

In some examples, the criterion can include a transition direction of the change. For example, the criterion can be that the change is to activate a feature, so a change deactivating the feature would not satisfy the criterion. In an example, the transition direction is disabling a rate-limiting or lower-quality setting. In an example, the transition direction is from a low-quality setting to a high-quality setting. In an example, the transition direction is from a high-quality setting to a low-quality setting.

In some examples, at 1010, the pseudonymous identifier 820 can be determined by, e.g., based at least in part on a value determined by, at least one of hashing or encrypting an identity value associated with the user device 804. Examples are discussed above, e.g., with reference to operation 812, PGW 816, or operation 818. For example, block 1010 can include hashing an MSISDN of user device 804. Block 1010 can be followed by block 904. In some examples, block 1010 can be followed by block 1008, as graphically represented by the dashed line. In some examples, blocks can be performed in at least one of the following orders: 902, 1008, 1010, 904; 902, 1010, 1008, 904; 902, 1008, 904; or 902, 1010, 904.

Figure 11:
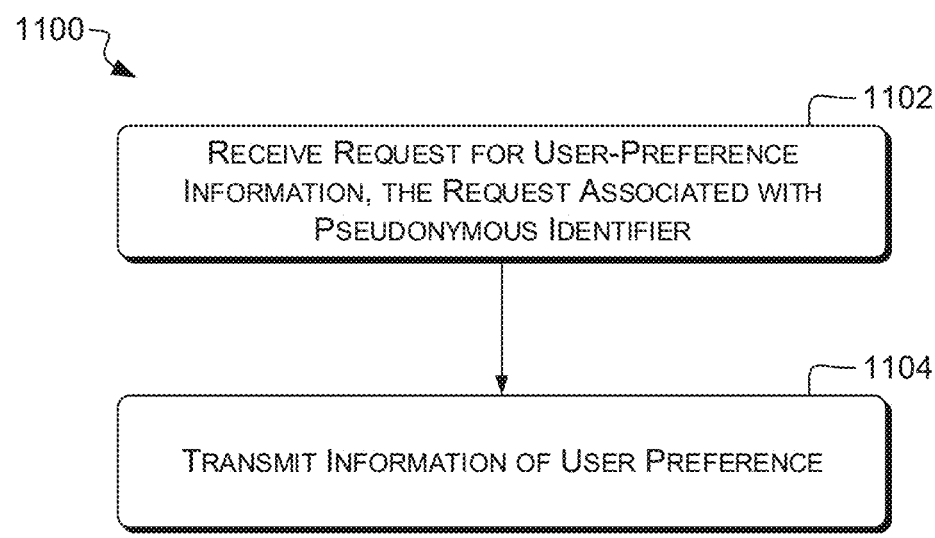
FIG. 11 illustrates an example process for providing access to user preferences.

FIG. 11 illustrates an example process 1100 for providing access to user preferences. In some examples, process 1100 can be carried out by a preference server 814.

In some examples, at 1102, a request for user-preference information can be received, e.g., via the network interface. The request can be associated with the pseudonymous identifier 820. For example, the request can include the pseudonymous identifier 820 or be transmitted from a network address associated with the pseudonymous identifier 820. In some examples, the request can be transmitted by content provider 106. Examples are discussed above, e.g., with reference to operation 828.

In some examples, at 1104, information of the user preference can be transmitted, e.g., via the network interface. For example, a response indicating preference information associated with the pseudonymous identifier 820 can be transmitted. Examples are discussed above, e.g., with reference to operations 826 or 828. Blocks 1102 and 1104 can, e.g., permit third-party content providers to determine user preference information without accessing private information of the users.

Figure 12:
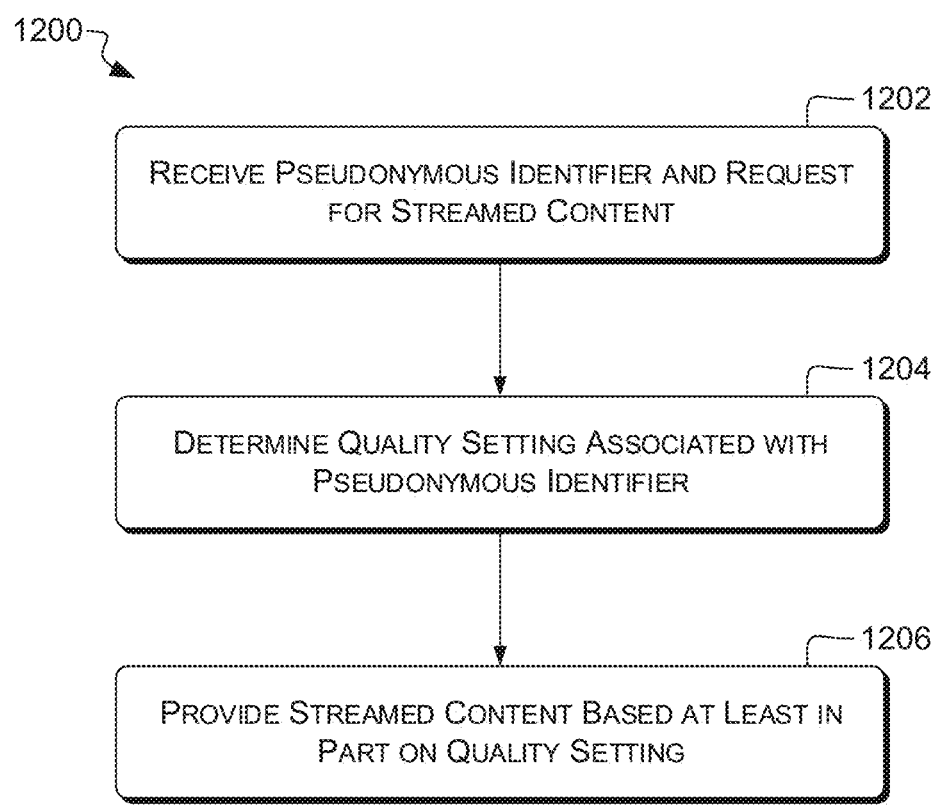
FIG. 12 illustrates an example process for providing streamed content.

FIG. 12 illustrates an example process 1200 for providing streamed content, e.g., streamed audio, video, photos, or events. Process 1200 can be carried out, e.g., by content provider 106.

In some examples, at 1202, a pseudonymous identifier 820 and a request for streamed content can be received, e.g., via a telecommunications network 108. For example, the request can include an HTTP request, e.g., "GET https://example.com/watch/video42", and the pseudonymous identifier 820 can be carried in a header or URL parameter of the request.

In some examples, at 1204, a quality setting associated with the pseudonymous identifier 820 can be determined. For example, the pseudonymous identifier 820 can be used as a key to retrieve the quality setting a database of user preferences. In some examples, block 1204 can include transmitting the pseudonymous identifier 820 to, e.g., a preference server 814, and receiving information of the quality setting. Examples are discussed above, e.g., with reference to operation 828.

In some examples, at 1206, the streamed content can be provided based at least in part on the quality setting. For example, compressed video can be streamed by the content provider 106 to the user device 804.

Figure 13:
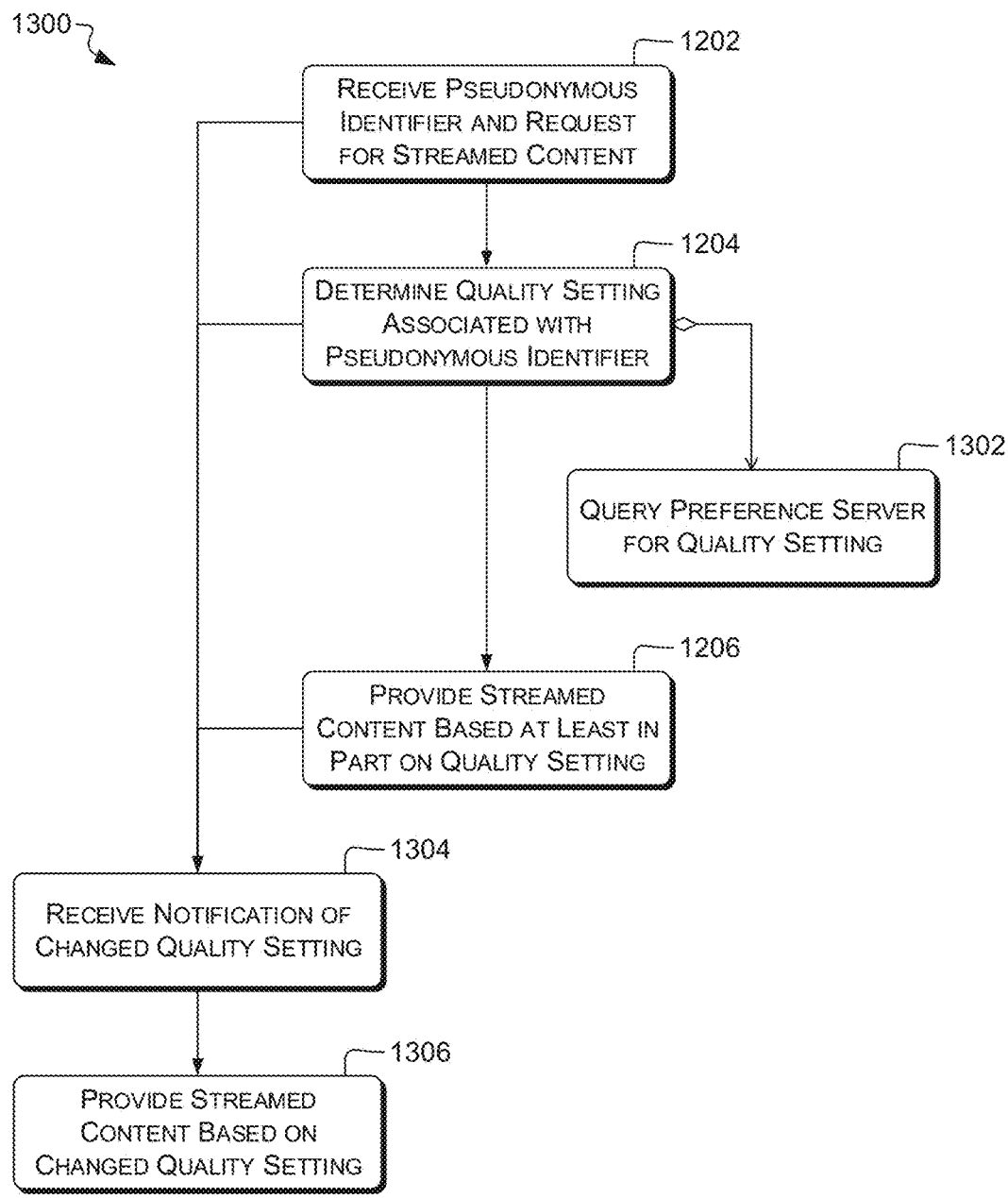
FIG. 13 illustrates an example process for providing streamed content.

FIG. 13 illustrates an example process 1300 for providing streamed content. In some examples, process 1300 can be carried out by content provider 106. In some examples, block 1204 can include block 1302, as indicated by the diamond arrow. In some examples, at least one of blocks 1202, 1204, or 1206 can be followed by blocks 1304 or 1306.

In some examples, at 1302, a preference server 814 can be queried for the quality setting using the pseudonymous identifier 820. Examples are discussed above, e.g., with reference to operation 828.

In some examples, at 1304, a notification can be received, e.g., via network 108, of a changed quality setting. The notification can include the pseudonymous identifier 820. Examples are discussed above, e.g., with reference to operations 826 or 828. Block 1304 can be followed by block 1306.

In some examples, at 1306, the streamed content can be provided based at least in part on the changed quality setting, e.g., instead of the original quality setting. For example, when the user changes a user preference, e.g., related to participation in a program for free or reduced charge data consumption, the preference server 814 can notify at least one content provider 106 of the change associated with the respective pseudonymous identifier 820. A particular content provider 106 can notify the application 810 or otherwise adjust streaming, e.g., if a session associated with the noted pseudonymous identifier 820 is active.

Figure 14:
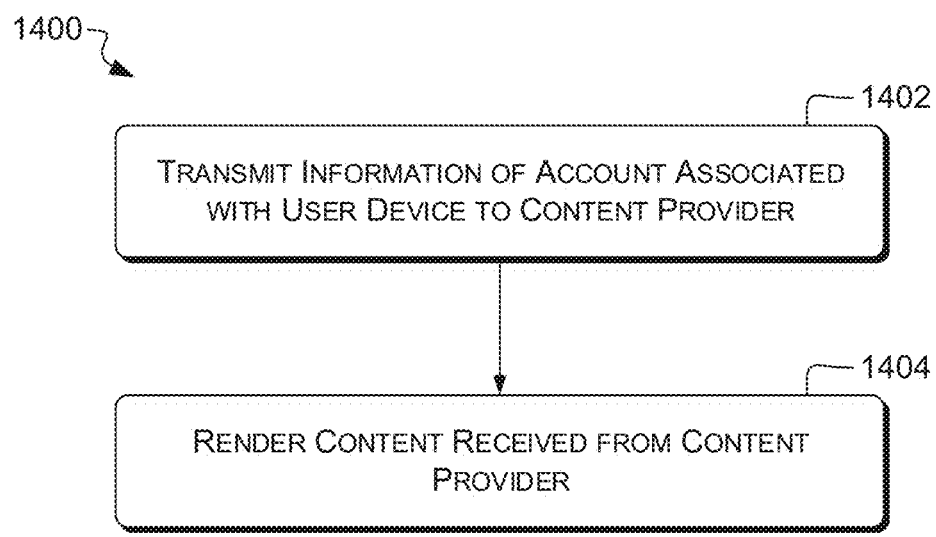
FIG. 14 illustrates an example process for managing content streaming.

FIG. 14 illustrates an example process 1400 for managing content streaming. Process 1400 can be carried out, e.g., by user device 804. User device 804 can include a processor; a network interface communicatively connectable with a telecommunications network 108; and an application 810. The application 810, when operated by the processor, can perform operations of process 1400.

In some examples, at 1402, information of an account associated with the user device can be transmitted to a content provider 106, e.g., a third-party content provider 106. The information can be transmitted, e.g., via the network interface. For example, the information can include a pseudonymous identifier 820 or a user preference. In some examples, block 1402 can include transmitting the information of the account comprising an indication of a user preference related to the rendering of the content.

In some examples, at block 1404, content received from the content provider 106 via the network interface can be rendered. For example, the content can be associated with the transmitted information, e.g., by having a compression level corresponding to a quality setting in the information.

Figure 15:
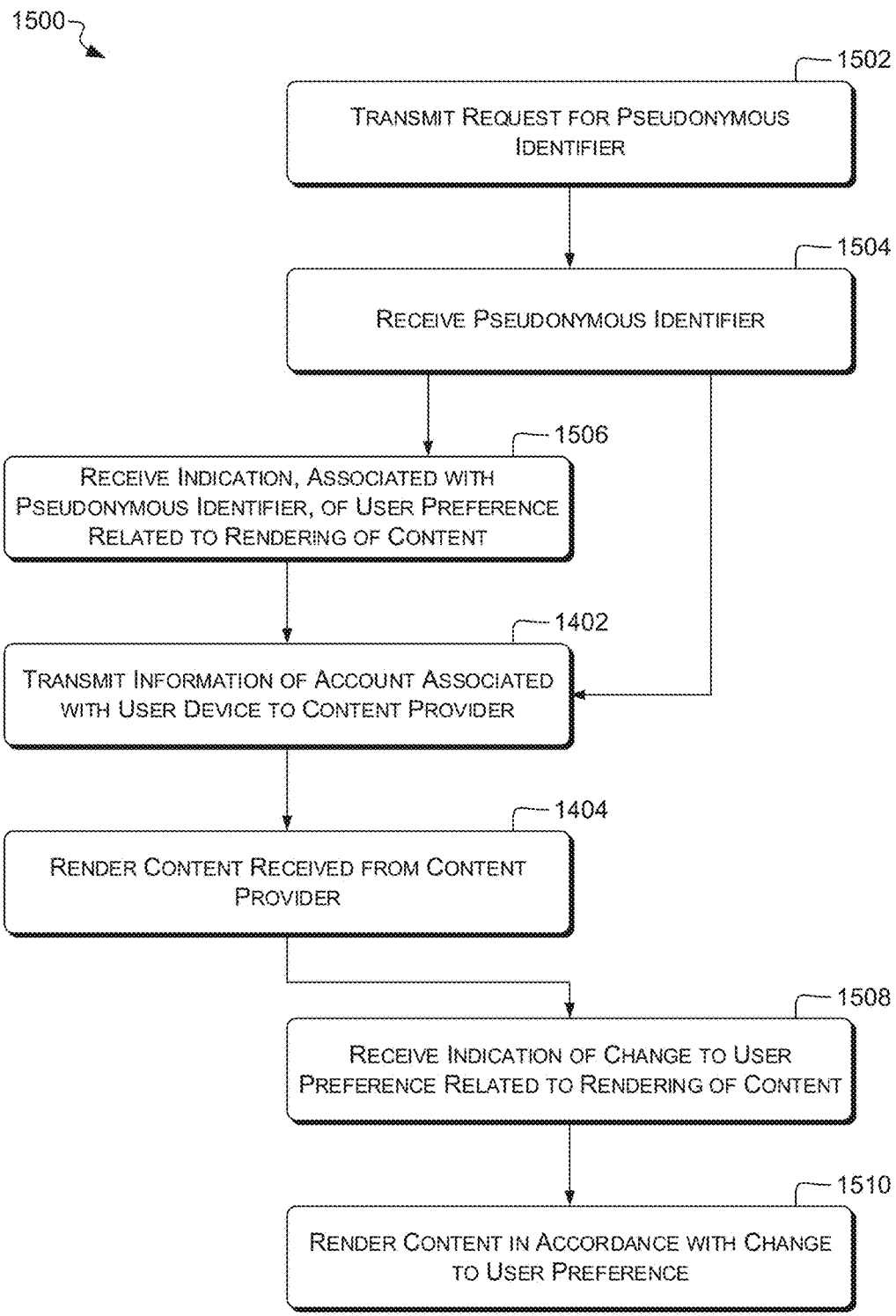
FIG. 15 illustrates an example process for managing content streaming.

FIG. 15 illustrates an example process 1500 for managing content streaming. Process 1400 can be carried out, e.g., by user device 804. In some examples, block 1402 can be preceded by blocks 1502, 1504, or 1506, or block 1404 can be followed by blocks 1508 or 1510.

In some examples, at 1502, a request for a pseudonymous identifier 820 can be transmitted, e.g., via the network interface. Examples are discussed above, e.g., with reference to operation 812.

In some examples, at 1504, the pseudonymous identifier 820 can be received, e.g., via the network interface. Examples are discussed above, e.g., with reference to operation 818. Block 1504 can be followed by block 1402, in which the information of the account comprising the pseudonymous identifier 820 can be transmitted. Block 1504 can additionally or alternatively be followed by block 1506.

In some examples, at 1506, in association with the pseudonymous identifier 820, an indication of a user preference related to the rendering of the content can be received. For example, the user preference can indicate whether or not content should be downgraded, as described herein. Block 1506 can be followed by block 1402, in which the indication of the user preference can be transmitted in association with the pseudonymous identifier 820.

In some examples, at 1508, an indication of a change to a user preference related to the rendering of the content can be received, e.g., via the network interface. Examples are discussed above, e.g., with reference to operation 832 or 834. Block 1508 can be followed by block 1510.

In some examples, at 1510, the content can be rendered in accordance with the change to the user preference. For example, the application 810 can adjust scaling of video content to fill the screen at a resolution indicated by the changed user preference.

In some examples, block 1510 can include rendering at a quality level dependent on whether the playback is the first in a session. In some examples, the first content stream to be played in a session can initially be requested or rendered at a relatively lower quality level, e.g., 480p. This can permit application 810 to measure network conditions and determine whether a relatively higher quality level might be available. In some examples, one or more subsequent playbacks in a session can starts at the highest quality level of the previous playback of that type (e.g., audio or video). In some examples, one or more subsequent playbacks in a session can also start at the relatively lower quality level. This can reduce playback delays due to re-buffering.

Figure 16:
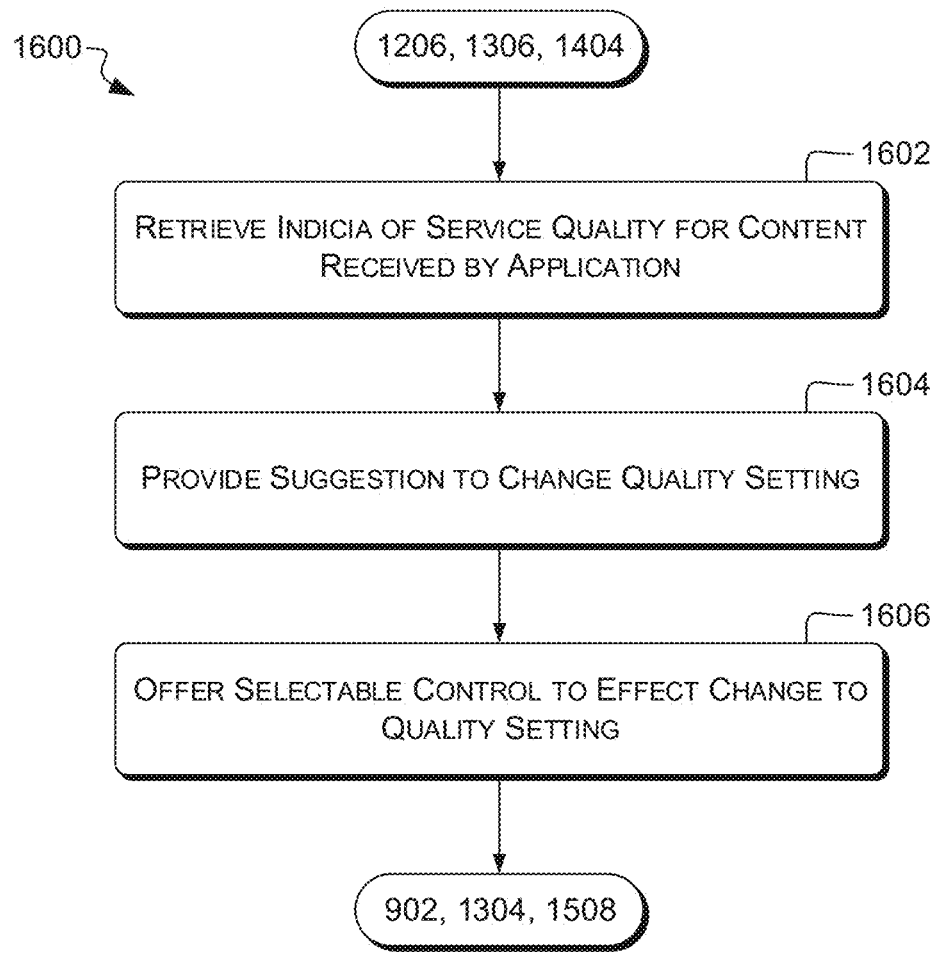
FIG. 16 illustrates an example process for managing transmission bandwidth.

FIG. 16 illustrates an example process 1600 for managing transmission bandwidth. Process 1600 can be carried out, e.g., by user device 804. For example, user device 804 can include a consumption management module 114 such as described above. Additionally or alternatively, a settings module 808 can perform at least some of the functions of process 1600. In some examples, operations of processes 1400 or 1500 can be used together with operations of process 1600. In some examples, block 1602 can be preceded by block 1206, 1306, or 1404.

In some examples, at 1602, retrieving indicia from the telecommunications network of a service quality for content received by the application, a content consumption limit associated with a data plan of a user of the user device, and a content consumption metric for a total amount of content consumed in a time period. In some examples, the service quality for the content is one of a resolution of the content or a data transfer rate of the content, e.g., as discussed above.

In some examples, at 1604, based at least in part on the indicia, providing a suggestion to change a quality setting which specifies the service quality of the content received by the application. In some examples, the suggestion can be provided to the user via an overlay user interface, e.g., as discussed herein with reference to FIG. 1 or 5.

In some examples, at 1606, offering a selectable control to effect the change to the quality setting. In some examples, the selectable control, or both the suggestion and the selectable control, are provided to the user via an overlay user interface, e.g., as discussed herein with reference to FIG. 1 or 5. In some examples, block 1606 can be followed by block 902, 1304, or 1508.

Example Clauses

A: A user device comprising: a processor; an application which, when operated by the processor, renders content received from a third-party content provider over a telecommunications network; and a content consumption management module which, when operated by the processor, performs operations comprising: retrieving indicia from the telecommunications network of a service quality for content received by the application, a content consumption limit associated with a data plan of a user of the user device, and a content consumption metric for a total amount of content consumed in a time period; based at least in part on the indicia, providing a suggestion to change a quality setting which specifies the service quality of the content received by the application; and offering a selectable control to effect the change to the quality setting.

B: The user device of paragraph A, wherein the service quality for the content is one of a resolution of the content or a data transfer rate of the content.

C: The user device of paragraph A or B, wherein the operations further comprise retrieving a usage history of the user, predicting, based on the usage history, whether the user's content consumption will exceed the content consumption limit before an end of the time period, and offering the selectable control to effect the change based on the predicting.

D: The user device of paragraph C, wherein the offering includes providing an option to consume content at a service quality such that the content consumption limit is met, but not exceeded.

E: The user device of any of paragraphs A-D, wherein the suggestion and the selectable control are provided to the user via an overlay user interface.

F: The user device of any of paragraphs A-E, wherein the suggestion is provided to the user via an overlay user interface and the selectable control is offered via a settings user interface.

G: The user device of any of paragraphs A-F, wherein the suggestion to change the quality setting includes a suggestion of a quality setting based at least in part on a device type of the user device.

H: The user device of any of paragraphs A-G, wherein the quality setting specifies a service quality for both the content and all other content of a same type as the content, regardless of the providing service or application.

I: The user device of any of paragraphs A-H, wherein the retrieving is performed responsive to determining that the application is rendering the content.

J: The user device of any of paragraphs A-I, wherein offering the selectable control includes providing an option to opt in or out of a data consumption plan that doesn't charge for content consumption at or below a service quality threshold.

K: A computer-implemented method comprising: receiving, by a telecommunications network, a quality setting selected by a subscriber of the telecommunications network for consumption of video content by the subscriber; and reducing, by the telecommunications network, network resources available for transmission of the video content to the subscriber to cause third-party content providers of video content to reduce a service quality of the video content they transmit to no more than the quality setting.

L: The computer-implemented method of paragraph K, wherein the receiving is performed by a policy and charging rules function (PCRF) node of the telecommunications network and the method further comprises storing, at the PCRF node, the quality setting.

M: The computer-implemented method of paragraph L, wherein the receiving comprises receiving the quality setting from a billing server of the telecommunications network, the billing server having received the quality setting from a user device.

N: The computer-implemented method of any of paragraphs K-M, wherein the quality setting is either selected by the subscriber or is a default quality setting selected for the subscriber.

O: The computer-implemented method of any of paragraphs K-N, wherein the reducing comprises instructing a gateway general packet radio service (GPRS) support node (GGSN) or a packet data network gateway (PGW) to reduce the network resources available for the transmission of the video content.

P: The computer-implemented method of paragraph O, wherein the third-party content providers of the video content to reduce the service quality of the video content they transmit to no more than the quality setting in response to testing the telecommunications network and determining, based on the testing, that the network resources are reduced.

Q: The computer-implemented method of any of paragraphs K-P, wherein the receiving comprises receiving quality settings associated with consumption of multiple corresponding types of content, and the telecommunications network reduces network resources responsive to some of the quality settings but does not reduce network resources responsive to others of the quality settings.

R: The computer-implemented method of paragraph Q, wherein the telecommunications network does not reduce network resources responsive to receiving quality settings associated with consumption of content for which the telecommunications network does not charge.

S: A computer-implemented method comprising: receiving an indication that a subscriber to a data plan is consuming video content; determining whether the subscriber has elected to participate in a program offering consumption of the video content free of charge in exchange for the video content being provided to the subscriber at a limited service quality; and conditionally excluding the consuming of the video content from a consumption metric of the data plan that is associated with a consumption limit based at least in part on whether the subscriber has elected to participate in the program.

T: The computer-implemented method of paragraph S, wherein the consuming of the video content is not excluded from the consumption metric when the consumption limit has been exceeded, regardless of whether the subscriber has elected to participate in the program.

U: The computer-implemented method of paragraph S or T, further comprising: excluding the consuming of the video content from the consumption metric based on the subscriber electing to participate in the program; including further consumption of video content in the consumption metric based on the subscriber changing the election to not participate in the program; and excluding further consumption of video content from the consumption metric based on the subscriber changing the election to participate in the program again.

V: A telecommunications network, comprising: a core network device of the telecommunications network communicatively connectable with a user device, the core network device configured to: receive, via a network interface, an indication of a change to a user preference associated with the user device; and transmit, via the network interface, a notification message including a pseudonymous identifier, the notification message based at least in part on the indication of the change.

W: The telecommunications network as recited in paragraph V, wherein the core network device is further configured to include in the notification message data corresponding to the indication of the change.

X: The telecommunications network as recited in paragraph V or W, wherein the core network device is further configured to determine the pseudonymous identifier by at least one of hashing or encrypting an identity value associated with the user device.

Y: The telecommunications network as recited in paragraph X, wherein the core network device is further configured to receive the identity value in association with the indication of the change.

Z: The telecommunications network as recited in any of paragraphs V-Y, wherein the core network device is further configured to determine that the change satisfies a predetermined criterion; and, in response, transmit the notification message.

AA: The telecommunications network as recited in paragraph Z, wherein the predetermined criterion comprises a transition direction of the change.

AB: The telecommunications network as recited in any of paragraphs V-AA, wherein the core network device is further configured to: receive, via the network interface, a request for user-preference information, the request associated with the pseudonymous identifier; and transmit, via the network interface, information of the user preference.

AC: The telecommunications network as recited in any of paragraphs V-AB, wherein the core network device is further configured to receive the indication of the change comprising the pseudonymous identifier.

AD: The telecommunications network as recited in any of paragraphs V-AC, wherein the core network device is further configured to: receive, via the network interface, a request for preference information, the request comprising a pseudonymous identifier; and transmit, via the network interface, a response indicating preference information associated with the pseudonymous identifier.

AE: The telecommunications network as recited in any of paragraphs V-AD, further comprising a configuration device configured to: receive, via a user interface, information of the change to the user preference; and transmit the indication of the change to the core network device.

AF: The telecommunications network as recited in any of paragraphs V-AE, further comprising a node configured to reduce network resources available for transmission of content to the user device in response to the change to the user preference.

AG: The telecommunications network as recited in any of paragraphs V-AF, further comprising transmitting a plurality of notification messages including respective pseudonymous identifiers, each of the plurality of notification messages based at least in part on the indication of the change.

AH: A computer-implemented method comprising: receiving, via a telecommunications network, a pseudonymous identifier and a request for streamed content; determining a quality setting associated with the pseudonymous identifier; and providing the streamed content based at least in part on the quality setting.

AI: The computer-implemented method of paragraph AH, wherein the determining comprises querying a preference server for the quality setting using the pseudonymous identifier.

AJ: The computer-implemented method of paragraph AI, further comprising: receiving a notification of a changed quality setting, the notification comprising the pseudonymous identifier; and providing the streamed content based at least in part on the changed quality setting.

AK: A computer-readable medium, e.g., a computer storage medium, having thereon computer-executable instructions, the computer-executable instructions upon execution configuring a computer to perform operations as any of paragraphs AH-AJ recites.

AL: A device comprising: a processor; and a computer-readable medium, e.g., a computer storage medium, having thereon computer-executable instructions, the computer-executable instructions upon execution by the processor configuring the device to perform operations as any of paragraphs AH-AJ recites.

AM: A system comprising: means for processing; and means for storing having thereon computer-executable instructions, the computer-executable instructions including means to configure the system to carry out a method as any of paragraphs AH-AJ recites.

AN: A user device comprising: a processor: a network interface communicatively connectable with a telecommunications network; and an application that, when operated by the processor, performs operations comprising: transmitting, via the network interface, information of an account associated with the user device to a content provider; and rendering content received from the content provider via the network interface.

AO: The user device of paragraph AN, the operations further comprising: transmitting, via the network interface, a request for a pseudonymous identifier; receiving, via the network interface, the pseudonymous identifier; transmitting, via the network interface, the information of the account comprising the pseudonymous identifier.

AP: The user device of paragraph AO, the operations further comprising: receiving, in association with the pseudonymous identifier, an indication of a user preference related to the rendering of the content; and transmitting, in association with the pseudonymous identifier, the indication of the user preference.

AQ: The user device of any of paragraphs AN-AP, the operations further comprising transmitting, via the network interface, the information of the account comprising an indication of a user preference related to the rendering of the content.

AR: The user device of any of paragraphs AN-AQ, the operations further comprising: receiving, via the network interface, an indication of a change to a user preference related to the rendering of the content; and rendering the content in accordance with the change to the user preference.

AS: The user device of any of paragraphs AN-AR, further comprising a content consumption management module that, when operated by the processor, performs operations comprising: retrieving indicia from the telecommunications network of a service quality for content received by the application, a content consumption limit associated with a data plan of a user of the user device, and a content consumption metric for a total amount of content consumed in a time period, based at least in part on the indicia, providing a suggestion to change a quality setting which specifies the service quality of the content received by the application; and offering a selectable control to effect the change to the quality setting.

AT. The user device of paragraph AS, wherein the service quality for the content is one of a resolution of the content or a data transfer rate of the content.

AU. The user device of paragraph AS or AT, wherein the suggestion and the selectable control are provided to the user via an overlay user interface.

AV: The user device of any of paragraphs AS-AU, wherein the offering includes providing an option to consume content at a service quality such that the content consumption limit is met, but not exceeded.

AW: The user device of any of paragraphs AS-AV, wherein the suggestion is provided to the user via an overlay user interface and the selectable control is offered via a settings user interface.

AX: The user device of any of paragraphs AS-AW, wherein the suggestion to change the quality setting includes a suggestion of a quality setting based at least in part on a device type of the user device.

AY: The user device of any of paragraphs AS-AX, wherein the quality setting specifies a service quality for both the content and all other content of a same type as the content, regardless of the providing service or application.

AZ: The user device of any of paragraphs AS-AY, wherein the retrieving is performed responsive to determining that the application is rendering the content.

BA: The user device of any of paragraphs AS-AZ, wherein offering the selectable control includes providing an option to opt in or out of a data consumption plan that doesn't charge for content consumption at or below a service quality threshold.

CONCLUSION

According to some examples, a network device, e.g., preference server 814, can maintain and distribute information about user preferences. According to some examples, a user device 804 can request a pseudonymous identifier 820 and provide the pseudonymous identifier 820 to a content provider 106. According to some examples, the content provider 106 can retrieve or otherwise receive user preference information associated with the pseudonymous identifier 820. According to some examples, the content provider 106 can provide content as directed or indicated by user preferences. According to some examples, an operator of a telecommunications network 108 can provide one or more API(s), e.g., exposed via HTTPS endpoints, permitting user devices 804 to retrieve pseudonymous identifiers 820 or permitting content providers 106 to retrieve user preferences. According to some examples, an operator of a telecommunications network 108 can push user-preference updates to one or more content providers 106.

According to some examples, a user device described herein suggests a change to a quality setting associated with the consumption of content from one or more content providers. The change is suggested based both on a user's data plan and on a service quality of content received by the user device. This user-selected quality setting is then provided to the telecommunications network, which reduces network resources available for transmission of the content based on the quality setting. Such reduced network resources cause the content providers to provide content at a service quality no greater than the quality setting. Also, the user may be presented with or defaulted to selecting an option for a program offering consumption of the video content free of charge when provided to the user at a limited service quality. When the user participates, consumption of video content is then conditionally excluded from a consumption metric of the data plan.

Although some examples are described with respect to streamed content, techniques described herein can additionally or alternatively be used to control or manage transmissions of non-streamed content, e.g., discrete requests for Web pages.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Any routine descriptions, elements or blocks in the flow diagrams described herein or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A telecommunications network, comprising:
a core network device of the telecommunications network communicatively connectable with a user device, the core network device configured to:
receive, via a network interface, an indication of a change to a user preference associated with the user device; and
transmit, via the network interface, a notification message including a pseudonymous identifier that omits personally-identifiable information of a user, the notification message based at least in part on the indication of the change.

2. The telecommunications network as recited in claim 1, wherein the core network device is further configured to include in the notification message data corresponding to the indication of the change.

3. The telecommunications network as recited in claim 1, wherein the core network device is further configured to determine the pseudonymous identifier by at least one of hashing or encrypting an identity value associated with the user device.

4. The telecommunications network as recited in claim 1, wherein the core network device is further configured to determine that the change satisfies a predetermined criterion; and, in response, transmit the notification message.

5. The telecommunications network as recited in claim 1, wherein the core network device is further configured to:
receive, via the network interface, a request for user-preference information, the request associated with the pseudonymous identifier; and
transmit, via the network interface, information of the user preference.

6. The telecommunications network as recited in claim 1, wherein the core network device is further configured to receive the indication of the change comprising the pseudonymous identifier.

7. The telecommunications network as recited in claim 1, wherein the core network device is further configured to:
receive, via the network interface, a request for preference information, the request comprising a pseudonymous identifier; and
transmit, via the network interface, a response indicating preference information associated with the pseudonymous identifier.

8. The telecommunications network as recited in claim 1, further comprising a configuration device configured to:
receive, via a user interface, information of the change to the user preference; and
transmit the indication of the change to the core network device.

9. The telecommunications network as recited in claim 1, further comprising a node, wherein:
the core network device is configured to transmit the notification message to the node; and
the node is configured to reduce network resources available for transmission of content to the user device in response to the notification message indicating the change to the user preference.

10. A computer-implemented method comprising:
receiving, via a telecommunications network, a pseudonymous identifier that omits personally-identifiable information of a user;
receiving, via the telecommunications network, a request for streamed content;
determining, by a content provider, a quality setting associated with the pseudonymous identifier;
providing a first portion of the streamed content to a user device via the telecommunications network based at least in part on the quality setting;
after determining the quality setting, receiving a notification of a changed quality setting via the telecommunications network, the notification comprising the pseudonymous identifier; and
providing a second portion of the streamed content based at least in part on the changed quality setting.

11. The computer-implemented method of claim 10, wherein the determining comprises querying a preference server for the quality setting using the pseudonymous identifier.

12. The computer-implemented method of claim 10, further comprising performing the recited operations by the content provider.

13. The computer-implemented method of claim 10, further comprising receiving the notification of the changed quality setting as a push notification from a preference server.

14. A user device comprising:
a processor;
a network interface communicatively connectable with a telecommunications network; and
an application that, when operated by the processor, performs operations comprising:
transmitting, via the network interface, a request for a pseudonymous identifier;
receiving, via the network interface, the pseudonymous identifier;
transmitting, via the network interface, information of an account associated with the user device to a content provider, the information of the account comprising the pseudonymous identifier and omitting personally-identifiable information of a user of the user device;
rendering content received from the content provider via the network interface;
subsequently, receiving, via the network interface, an indication of a change to a user preference related to the rendering of the content; and rendering the content in accordance with the change to the user preference.

15. The user device of claim 14, the operations further comprising:
    receiving, in association with the pseudonymous identifier, an indication of a user preference related to the rendering of the content; and
    transmitting, in association with the pseudonymous identifier, the indication of the user preference.

16. The user device of claim 14, the operations further comprising transmitting, via the network interface, the information of the account comprising an indication of a user preference related to the rendering of the content.

17. The user device of claim 14, further comprising a content consumption management module that, when operated by the processor, performs operations comprising:
    retrieving indicia from the telecommunications network of a service quality for content received by the application, a content consumption limit associated with a data plan of a user of the user device, and a content consumption metric for a total amount of content consumed in a time period;
    based at least in part on the indicia, providing a suggestion to change a quality setting which specifies the service quality of the content received by the application; and
    offering a selectable control to effect the change to the quality setting.

18. The user device of claim 17, wherein the service quality for the content is one of a resolution of the content or a data transfer rate of the content.

19. The user device of claim 17, wherein the suggestion and the selectable control are provided to the user via an overlay user interface.

20. The user device of claim 14, wherein:
    the user device further comprises a settings module that, when operated by the processor:
        receives the change to the user preference via a user interface of the user device; and
        transmit a second indication of the change to the user preference via the network interface to a preference server; and
    the application is configured to receive the indication of the change to the user preference from the preference server.

* * * * *